US012614341B2

(12) United States Patent
Gildert et al.

(10) Patent No.: US 12,614,341 B2
(45) **Date of Patent: *Apr. 28, 2026**

(54) SYSTEMS, METHODS, AND COMPUTER PROGRAM PRODUCTS FOR POPULATING ENVIRONMENT MODELS

(71) Applicant: Sanctuary Cognitive Systems Corporation, Vancouver (CA)

(72) Inventors: Suzanne Gildert, Vancouver (CA); Geordie Rose, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 288 days.

This patent is subject to a terminal disclaimer.

(21) Appl. No.: 18/367,115

(22) Filed: Sep. 12, 2023

(65) Prior Publication Data

US 2024/0096003 A1 Mar. 21, 2024

Related U.S. Application Data

(60) Provisional application No. 63/407,374, filed on Sep. 16, 2022.

(51) Int. Cl.
| | |
|---|---|
| *G06T 15/20* | (2011.01) |
| *G06T 7/73* | (2017.01) |
| *G06T 19/20* | (2011.01) |

(52) U.S. Cl.
CPC ............... *G06T 15/20* (2013.01); *G06T 7/75* (2017.01); *G06T 19/20* (2013.01); *G06T 2219/2004* (2013.01)

(58) Field of Classification Search
CPC .......... G06T 15/20; G06T 7/75; G06T 19/20; G06T 2219/2004
See application file for complete search history.

(56) References Cited

U.S. PATENT DOCUMENTS

| | | | | |
|---|---|---|---|---|
| 11,127,202 B2 * | 9/2021 | Krishna | .................. | G08G 5/55 |
| 2018/0144547 A1 * | 5/2018 | Shakib | ................. | G06T 15/503 |
| 2019/0026958 A1 * | 1/2019 | Gausebeck | ............ | G06T 7/579 |

OTHER PUBLICATIONS

Varvadoukas, Theodoros, et al. "Indoor furniture and room recognition for a robot using internet-derived models and object context." 2012 10th International Conference on Frontiers of Information Technology. IEEE, 2012. (Year: 2012).*

Lowe, David G. "Three-dimensional object recognition from single two-dimensional images." Artificial intelligence 31.3 (1987): 355-395. (Year: 1987).*

* cited by examiner

*Primary Examiner* — Xin Sheng

(74) *Attorney, Agent, or Firm* — Thomas Mahon

(57) ABSTRACT

Systems, methods, and computer program products for managing and populating environment models are described. An environment model is accessed which represents an environment, and the environment model is populated with instances of object models. Locations where the instances of object models should be positioned in the environment model are identified, by determining where in the environment model a respective size of each instance when viewed from a vantage point at the environment model matches a size of the object represented by the respective instance when viewed from a corresponding vantage point at the environment.

17 Claims, 18 Drawing Sheets

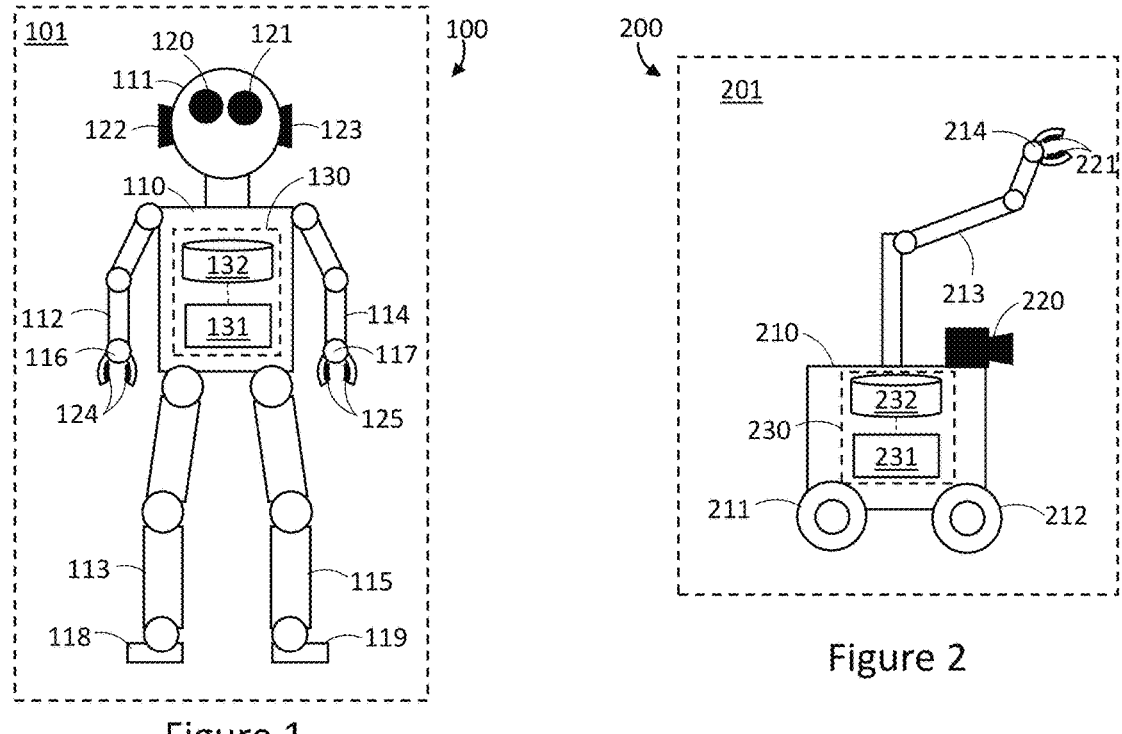
Figure 1
Figure 2
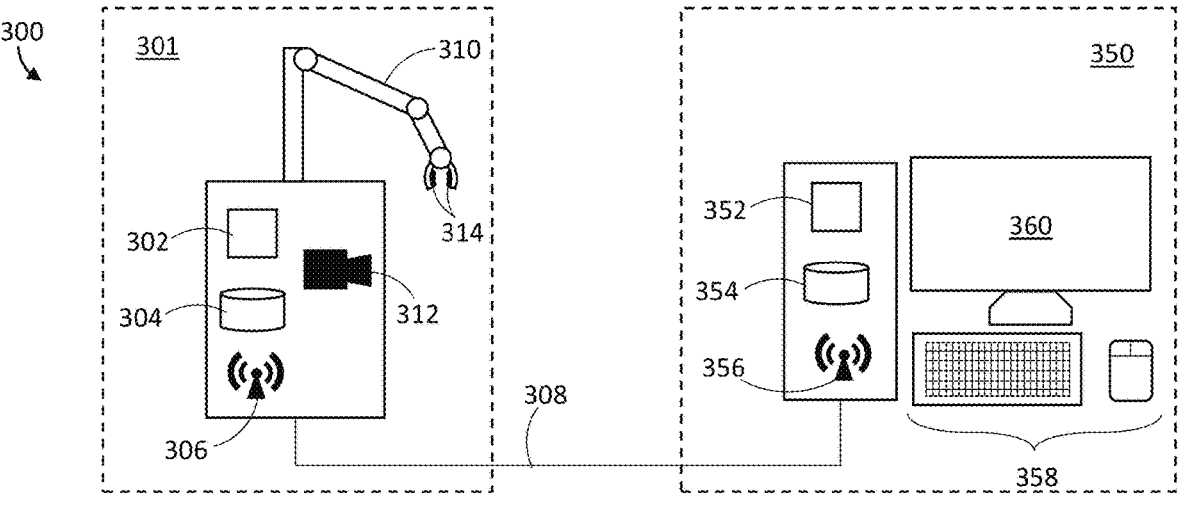
Figure 3

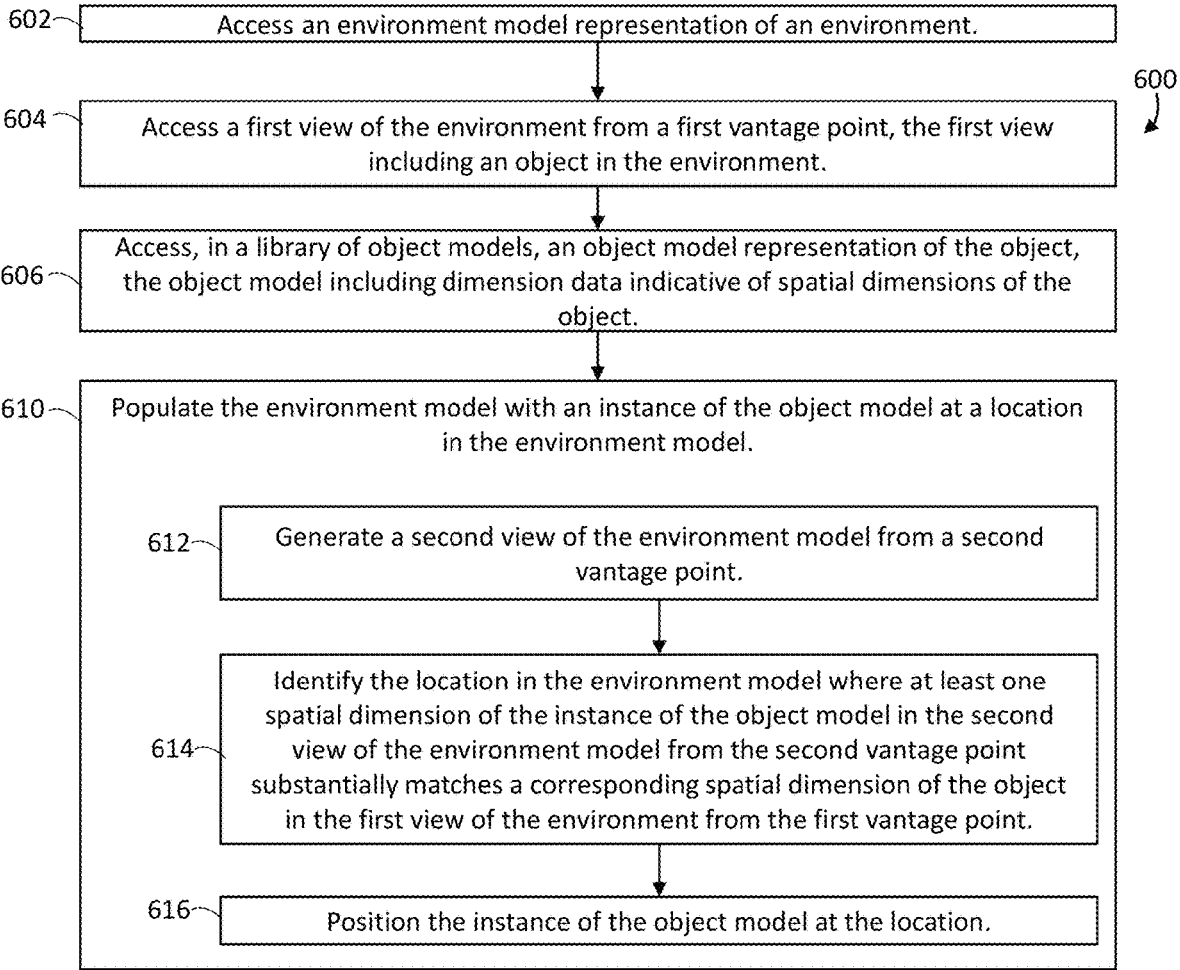

602 — Access an environment model representation of an environment.

600

604 — Access a first view of the environment from a first vantage point, the first view including an object in the environment.

606 — Access, in a library of object models, an object model representation of the object, the object model including dimension data indicative of spatial dimensions of the object.

610 — Populate the environment model with an instance of the object model at a location in the environment model.

612 — Generate a second view of the environment model from a second vantage point.

614 — Identify the location in the environment model where at least one spatial dimension of the instance of the object model in the second view of the environment model from the second vantage point substantially matches a corresponding spatial dimension of the object in the first view of the environment from the first vantage point.

616 — Position the instance of the object model at the location.

Figure 6

1310
1390
1396
1394
1392
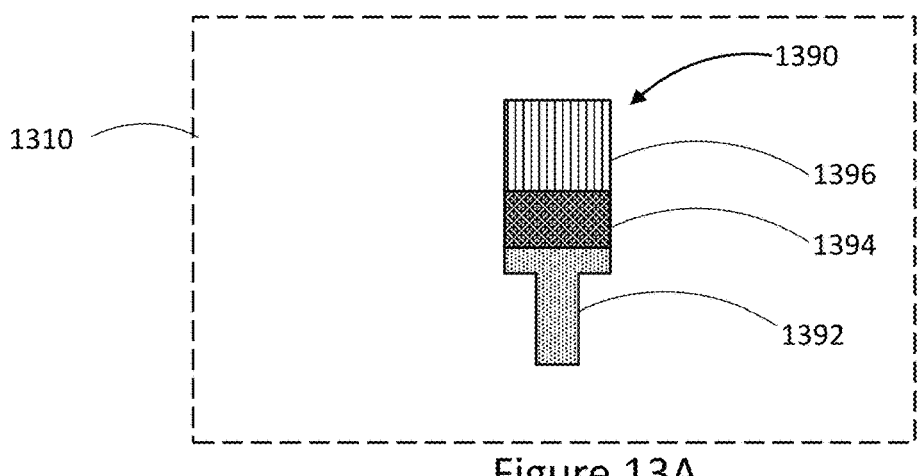
Figure 13A
1320
1384
1392
1394
1396
1390
1380
1382
Figure 13B
1330
1384
1392
1390
1380
1382
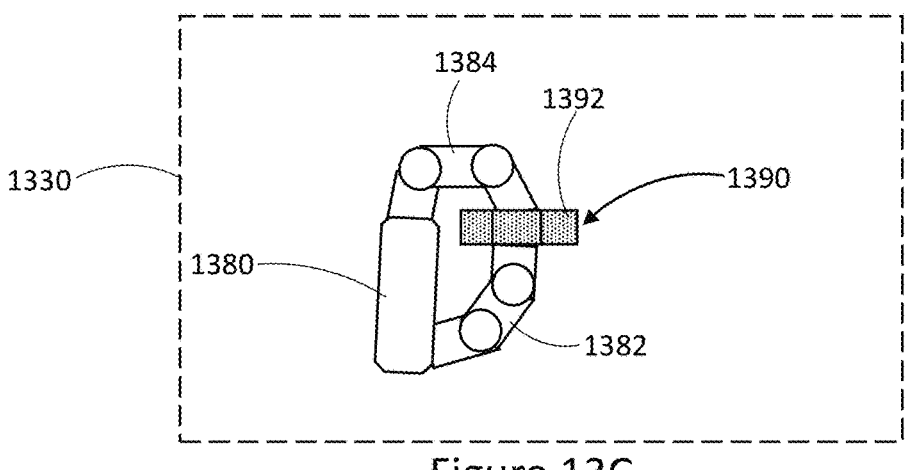
Figure 13C

SYSTEMS, METHODS, AND COMPUTER PROGRAM PRODUCTS FOR POPULATING ENVIRONMENT MODELS

TECHNICAL FIELD

The present systems, methods, and computer program products generally relate to managing simulated environments, and particularly relate to populating environment models with object models.

DESCRIPTION OF THE RELATED ART

Simulated environments are useful in a variety of applications, including virtual or augmented reality, video games, and robotics, to name a few examples. Robots are machines that may be deployed to perform work. General purpose robots (GPRs) can be deployed in a variety of different environments, to achieve a variety of objectives or perform a variety of tasks. Robots can utilize simulated environments to operate within a physical environment. Such simulated environments should be as robust as possible through effective and selective updating of environment models, to provide information that results in optimal performance in a given environment.

BRIEF SUMMARY

According to a broad aspect, the present disclosure describes a method comprising: accessing, by at least one processor, an environment model representation of an environment; accessing, by the at least one processor, a first view of the environment from a first vantage point, the first vantage point having a position and a perspective in relation to the environment, wherein the first view includes an object in the environment; accessing, in a library of object models, an object model representation of the object, the object model including dimension data indicative of spatial dimensions of the object; and populating the environment model with an instance of the object model at a location in the environment model, wherein populating the environment model with the instance of the object model at the location includes: generating a second view of the environment model from a second vantage point, wherein a position and a perspective of the second vantage point in relation to the environment model substantially match the position and the perspective of the first vantage point in relation to the environment; identifying the location in the environment model where at least one spatial dimension of the instance of the object model in the second view of the environment model from the second vantage point substantially matches a corresponding spatial dimension of the object in the first view of the environment from the first vantage point; and positioning the instance of the object model at the location.

The first view may comprise first image data having a first resolution; the second view may comprise second image data having a second resolution; identifying the location in the environment model where at least one spatial dimension of the instance of the object model in the second view of the environment model from the second vantage point substantially matches a corresponding spatial dimension of the object in the first view of the environment from the first vantage point may comprise: identifying the location in the environment model where a number of pixels occupied by the instance of the object model in the second image data corresponds to a number of pixels occupied by the object in the first image data. The first resolution may be equal to the second resolution; and identifying the location in the environment model where a number of pixels occupied by the instance of the object model in the second image data corresponds to a number of pixels occupied by the object in the first image data may comprise: identifying the location in the environment model where a number of pixels occupied by the instance of the object model in the second image data is equal to a number of pixels occupied by the object in the first image data. The first resolution may be different from the second resolution by a fixed ratio; identifying the location in the environment model where a number of pixels occupied by the instance of the object model in the second image data corresponds to a number of pixels occupied by the object in the first image data may comprise: identifying the location in the environment model where a number of pixels occupied by the instance of the object model in the second image data is equal to a number of pixels occupied by the object in the first image data multiplied by the fixed ratio.

The method may further comprise generating the object model representing the object in the library of object models. Generating the object model representing the object may comprise generating the object model representing the object, including the dimension data indicative of the spatial dimensions of the object. The method may further comprise capturing, by at least one image sensor, image data representing the object from multiple viewpoints, and generating the object model representing the object in the library of object models may comprise generating the object model based on the captured image data from multiple viewpoints. The method may further comprise capturing, by at least one haptic sensor positioned at an actuatable member which contacts the object, haptic data representing the object, and generating the object model representing the object in the library of object models may comprise generating the object model based on the captured haptic data.

The environment may be a three-dimensional environment; the environment model may be a three-dimensional environment model; the first view may comprise first two-dimensional image data representing the environment from the first vantage point; the second view may comprise second two-dimensional image data representing the environment model from the second vantage point; and populating the environment model with the instance of the object model at the location may further comprise, prior to identifying the location, positioning the instance of the object model in the second image data to correspond to a position of the object in the first image data. Populating the environment model with the instance of the object model at the location may further comprise, prior to identifying the location, orienting the instance of the object model in the second image data to correspond to an orientation of the object in the first image data. The method may further comprise determining a distance in the environment model between the second vantage point and the instance of the object model at the location.

The environment may be a physical environment, and the environment model may be a representation of the physical environment. The environment may be a virtual environment, and the environment model may be a representation of the virtual environment.

The at least one processor may be carried by a robot body positioned at the environment; and the robot body may carry at least one non-transitory processor-readable storage medium which stores the library of object models and the environment model.

The at least one processor may be positioned at a robot controller remote from the environment; and the robot controller may include at least one non-transitory processor-readable storage medium which stores the library of object models and the environment model.

The at least one processor may be carried by a robot body positioned at the environment; the robot body may carry a first at least one non-transitory processor-readable storage medium which stores the environment model; a robot controller remote from the robot body and operable to provide control data to the robot body, may include a second at least one non-transitory processor-readable storage medium which stores the library of object models; the robot body may include a communication interface communicatively couplable to the robot controller; accessing the environment model representation of the environment may comprise accessing, by the at least one processor, the environment model stored at the first at least one non-transitory processor-readable storage medium; accessing the first view of the environment may comprise accessing, by the at least one processor, the first view of the environment stored at the first at least one non-transitory processor-readable storage medium; accessing, in the library of object models, the object model may comprise accessing the object model in the library of models stored at the second at least one non-transitory processor-readable storage medium, via the communication interface; generating a second view of the environment model from the second vantage point may comprise generating, by the at least one processor, the second view of the environment model; identifying the location in the environment model may comprise identifying, by the at least one processor, the location in the environment model; and positioning the instance of the object model at the location may comprise updating, by the at least one processor, the environment model stored at the first at least one non-transitory processor-readable storage medium to include the instance of the object model at the location.

The method may further comprise capturing, by at least one image sensor, image data representing the first view of the environment from the first vantage point.

According to another broad aspect, the present disclosure describes a system comprising: at least one processor; and at least one non-transitory processor-readable storage medium communicatively coupled to the at least one processor, the at least one non-transitory processor-readable storage medium storing processor-executable instructions and/or data that, when executed by the at least one processor, cause the system to: access, by the at least one processor, an environment model representation of an environment; access, by the at least one processor, a first view of the environment from a first vantage point, the first vantage point having a position and a perspective in relation to the environment, wherein the first view includes an object in the environment; access, in a library of object models, an object model representation of the object, the object model including dimension data indicative of spatial dimensions of the object; and populate the environment model with an instance of the object model at a location in the environment model, wherein the processor-executable instructions which cause the system to populate the environment model with the instance of the object model at the location cause the system to: generate a second view of the environment model from a second vantage point, wherein a position and a perspective of the second vantage point in relation to the environment model substantially match the position and the perspective of the first vantage point in relation to the environment;

identify the location in the environment model where at least one spatial dimension of the instance of the object model in the second view of the environment model from the second vantage point substantially matches a corresponding spatial dimension of the object in the first view of the environment from the first vantage point; and position the instance of the object model at the location.

The first view may comprise first image data having a first resolution; the second view may comprise second image data having a second resolution; the processor-executable instructions which cause the system to identify the location in the environment model where at least one spatial dimension of the instance of the object model in the second view of the environment model from the second vantage point substantially matches a corresponding spatial dimension of the object in the first view of the environment from the first vantage point may cause the system to: identify the location in the environment model where a number of pixels occupied by the instance of the object model in the second image data corresponds to a number of pixels occupied by the object in the first image data. The first resolution may be equal to the second resolution; and the processor-executable instructions which cause the system to identify the location in the environment model where a number of pixels occupied by the instance of the object model in the second image data corresponds to a number of pixels occupied by the object in the first image data may cause the system to: identify the location in the environment model where a number of pixels occupied by the instance of the object model in the second image data is equal to a number of pixels occupied by the object in the first image data. The first resolution may be different from the second resolution by a fixed ratio; the processor-executable instructions which cause the system to identify the location in the environment model where a number of pixels occupied by the instance of the object model in the second image data corresponds to a number of pixels occupied by the object in the first image data may cause the system to: identify the location in the environment model where a number of pixels occupied by the instance of the object model in the second image data is equal to a number of pixels occupied by the object in the first image data multiplied by the fixed ratio.

The processor-executable instructions may further cause the system to generate the object model representing the object in the library of object models. The processor-executable instructions which cause the system to generate the object model representing the object may cause the system to: generate the object model representing the object, including the dimension data indicative of the spatial dimensions of the object. The system may further comprise at least one image sensor; the processor-executable instructions may further cause the system to capture, by the at least one image sensor, image data representing the object from multiple viewpoints; and the processor-executable instructions which cause the system to generate the object model representing the object in the library of object models may cause the system to generate the object model based on the captured image data from multiple viewpoints. The system may further comprise an actuatable member which contacts the object; and at least one haptic member positioned at the actuatable member; the processor-executable instructions may further cause the system to capture, by the at least one haptic sensor, haptic data representing the object; and the processor-executable instructions which cause the system to generate the object model representing the object in the library of object models may cause the system to generate the object model based on the captured haptic data.

The environment may be a three-dimensional environment; the environment model may be a three-dimensional environment model; the first view may comprise first two-dimensional image data representing the environment from the first vantage point; the second view may comprise second two-dimensional image data representing the environment model from the second vantage point; and the processor-executable instructions which cause the system to populate the environment model with the instance of the object model at the location may further cause the system to, prior to identifying the location, position the instance of the object model in the second image data to correspond to a position of the object in the first image data. The processor-executable instructions which cause the system to populate the environment model with the instance of the object model at the location may further cause the system to, prior to identifying the location, orient the instance of the object model in the second image data to correspond to an orientation of the object in the first image data. The processor-executable instructions may further cause the system to determine a distance in the environment model between the second vantage point and the instance of the object model at the location.

The environment may be a physical environment, and the environment model may be a representation of the physical environment. The environment may be a virtual environment, and the environment model may be a representation of the virtual environment.

The system may further comprise a robot body positioned at the environment; the at least one processor may be carried by the robot body; the at least one non-transitory processor-readable storage medium may be carried by the robot body; the at least one non-transitory processor-readable storage medium may store the library of object models; and the at least one non-transitory processor-readable storage medium may store the environment model.

The system may further comprise a robot controller remote from the environment; the at least one processor may be positioned at the robot controller; the at least one non-transitory processor-readable storage medium may be positioned at the robot controller; the at least one non-transitory processor-readable storage medium may store the library of object models; and the at least one non-transitory processor-readable storage medium may store the environment model.

The system may further comprise: a robot body positioned at the environment; a robot controller remote from the robot body, the robot controller operable to provide control data to the robot body; and a communication interface which communicatively couples the robot body and the robot controller. The at least one processor may be carried by the robot body; the at least one non-transitory processor-readable storage medium may include a first at least one non-transitory processor-readable storage medium carried by the robot body and a second at least one non-transitory processor-readable storage medium positioned at the robot controller; the first at least one non-transitory processor-readable storage medium may store the environment model; the second at least one non-transitory processor-readable storage medium may store the library of object models; the processor-executable instructions which cause the system to access the environment model representation of the environment may cause the system to: access, by the at least one processor, the environment model stored at the first at least one non-transitory processor-readable storage medium; the processor-executable instructions which cause the system to access the first view of the environment may cause the system to access, by the at least one processor, the first view of the environment stored at the first at least one non-transitory processor-readable storage medium; the processor-executable instructions which cause the system to access, in the library of object models, the object model may cause the system to: access the object model in the library of models stored at the second at least one non-transitory processor-readable storage medium, via the communication interface; the processor-executable instructions which cause the system to generate a second view of the environment model from the second vantage point may cause the system to: generate, by the at least one processor, the second view of the environment model; the processor-executable instructions which cause the system to identify the location in the environment model may cause the system to: identify, by the at least one processor, the location in the environment model; and the processor-executable instructions which cause the system to position the instance of the object model at the location may cause the system to: update, by the at least one processor, the environment model stored at the first at least one non-transitory processor-readable storage medium to include the instance of the object model at the location.

The system may further comprise at least one image sensor, and the processor-executable instructions may further cause the system to capture, by the at least one image sensor, image data representing the first view of the environment from the first vantage point.

According to yet another broad aspect, the present disclosure describes a computer program product comprising at least one non-transitory processor-readable storage medium storing processor-executable instructions and/or data that, when executed by at least one processor of a processor-based system, cause the processor-based system to: access, by the at least one processor, an environment model representation of an environment; access, by the at least one processor, a first view of the environment from a first vantage point, the first vantage point having a position and a perspective in relation to the environment, wherein the first view includes an object in the environment; access, in a library of object models, an object model representation of the object, the object model including dimension data indicative of spatial dimensions of the object; and populate the environment model with an instance of the object model at a location in the environment model, wherein the processor-executable instructions which cause the processor-based system to populate the environment model with the instance of the object model at the location cause the processor-based system to: generate a second view of the environment model from a second vantage point, wherein a position and a perspective of the second vantage point in relation to the environment model substantially match the position and the perspective of the first vantage point in relation to the environment; identify the location in the environment model where at least one spatial dimension of the instance of the object model in the second view of the environment model from the second vantage point substantially matches a corresponding spatial dimension of the object in the first view of the environment from the first vantage point; and position the instance of the object model at the location.

The first view may comprise first image data having a first resolution; the second view may comprise second image data having a second resolution; the processor-executable instructions which cause the processor-based system to identify the location in the environment model where at least one spatial dimension of the instance of the object model in the second view of the environment model from the second vantage point substantially matches a corresponding spatial dimension of the object in the first view of the environment from the first vantage point may cause the processor-based system to: identify the location in the environment model where a number of pixels occupied by the instance of the object model in the second image data corresponds to a number of pixels occupied by the object in the first image data. The first resolution may be equal to the second resolution; and the processor-executable instructions which cause the processor-based system to identify the location in the environment model where a number of pixels occupied by the instance of the object model in the second image data corresponds to a number of pixels occupied by the object in the first image data may cause the processor-based system to: identify the location in the environment model where a number of pixels occupied by the instance of the object model in the second image data is equal to a number of pixels occupied by the object in the first image data. The first resolution may be different from the second resolution by a fixed ratio; the processor-executable instructions which cause the processor-based system to identify the location in the environment model where a number of pixels occupied by the instance of the object model in the second image data corresponds to a number of pixels occupied by the object in the first image data may cause the processor-based system to: identify the location in the environment model where a number of pixels occupied by the instance of the object model in the second image data is equal to a number of pixels occupied by the object in the first image data multiplied by the fixed ratio.

The processor-executable instructions may further cause the processor-based system to generate the object model representing the object in the library of object models. The processor-executable instructions which cause the processor-based system to generate the object model representing the object may cause the processor-based system to: generate the object model representing the object, including the dimension data indicative of the spatial dimensions of the object. The processor-executable instructions may further cause the processor-based system to capture, by at least one image sensor, image data representing the object from multiple viewpoints; and the processor-executable instructions which cause the processor-based system to generate the object model representing the object in the library of object models may cause the processor-based system to generate the object model based on the captured image data from multiple viewpoints. The processor-executable instructions may further cause the processor-based system to capture, by at least one haptic sensor positioned at an actuatable member which contacts the object, haptic data representing the object; and the processor-executable instructions which cause the processor-based system to generate the object model representing the object in the library of object models may cause the processor-based system to generate the object model based on the captured haptic data.

The environment may be a three-dimensional environment; the environment model may be a three-dimensional environment model; the first view may comprise first two-dimensional image data representing the environment from the first vantage point; the second view may comprise second two-dimensional image data representing the environment model from the second vantage point; and the processor-executable instructions which cause the processor-based system to populate the environment model with the instance of the object model at the location may further cause the processor-based system to, prior to identifying the location, position the instance of the object model in the second image data to correspond to a position of the object in the first image data. The processor-executable instructions which cause the processor-based system to populate the environment model with the instance of the object model at the location may further cause the processor-based system to, prior to identifying the location, orient the instance of the object model in the second image data to correspond to an orientation of the object in the first image data. The processor-executable instructions may further cause the processor-based system to determine a distance in the environment model between the second vantage point and the instance of the object model at the location.

The environment may be a physical environment, and the environment model may be a representation of the physical environment. The environment may be a virtual environment, and the environment model may be a representation of the virtual environment.

The at least one processor may be carried by a robot body positioned at the environment; the at least one non-transitory processor-readable storage medium may be carried by the robot body; the at least one non-transitory processor-readable storage medium may store the library of object models; and the at least one non-transitory processor-readable storage medium may store the environment model.

The at least one processor may be positioned at a robot controller remote from the environment; the at least one non-transitory processor-readable storage medium may be positioned at the robot controller; the at least one non-transitory processor-readable storage medium may store the library of object models; and the at least one non-transitory processor-readable storage medium may store the environment model.

The at least one processor may be carried by a robot body positioned at the environment; the at least one non-transitory processor-readable storage medium may include a first at least one non-transitory processor-readable storage medium carried by the robot body and a second at least one non-transitory processor-readable storage medium positioned at a robot controller remote from the robot body, the robot controller operable to provide control data to the robot body; the first at least one non-transitory processor-readable storage medium may store the environment model; the second at least one non-transitory processor-readable storage medium may store the library of object models; the processor-executable instructions which cause the processor-based system to access the environment model representation of the environment may cause the processor-based system to: access, by the at least one processor, the environment model stored at the first at least one non-transitory processor-readable storage medium; the processor-executable instructions which cause the system to access the first view of the environment may cause the processor-based system to access, by the at least one processor, the first view of the environment stored at the first at least one non-transitory processor-readable storage medium; the processor-executable instructions which cause the processor-based system to access, in the library of object models, the object model may cause the processor-based system to: access the object model in the library of models stored at the second at least one non-transitory processor-readable storage medium, via a communication interface which communicatively couples the robot body and the robot controller; the processor-executable instructions which cause the processor-based system to generate a second view of the environment model from the second vantage point may cause the processor-based system to: generate, by the at least one processor, the second view of the environment model; the processor-executable instructions which cause the processor-based system to identify the location in the environment model may cause the processor-based system to: identify, by the at least one processor, the location in the environment model; and the processor-executable instructions which cause the processor-based system to position the instance of the object model at the location may cause the processor-based system to: update, by the at least one processor, the environment model stored at the first at least one non-transitory processor-readable storage medium to include the instance of the object model at the location.

The processor-executable instructions may further cause the processor-based system to capture, by at least one image sensor, image data representing the first view of the environment from the first vantage point.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

FIGS. 1, 2, and 3 are respective illustrative diagrams of exemplary robot systems comprising various features and components described throughout the present systems, methods, and computer program products.

FIG. 6 is a flowchart diagram showing an exemplary method of populating an environment model.

FIGS. 11B and 110 are scene views of the environment model of FIGS. 7A and 7B, shown as image data comprising grids of pixels in process of being populated in accordance with at least two exemplary implementations.

FIGS. 13A, 13B, and 13C are scene views showing image data, based on which an object model is generated in accordance with at least one exemplary implementation.

DETAILED DESCRIPTION

Figure 4A:
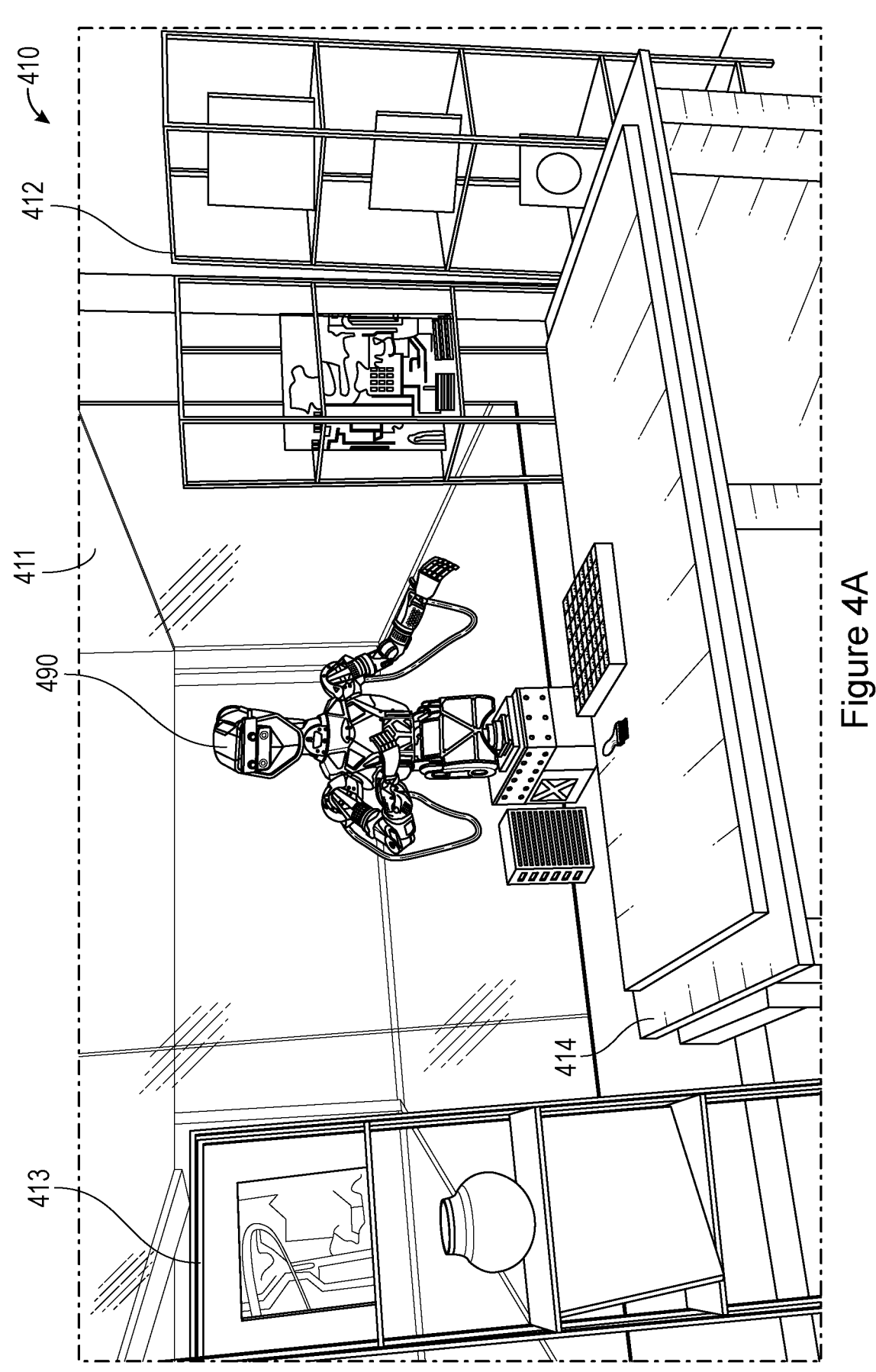
FIG. 4A is a scene view of an environment.

The following description sets forth specific details in order to illustrate and provide an understanding of the various implementations and embodiments of the present systems, methods, and computer program products. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, methods, and computer program products.

FIG. 1 is a front view of an exemplary robot system 100 in accordance with one implementation of the present systems, methods, and computer program products. In the illustrated example, robot system 100 includes a robot body 101 that is designed to approximate human anatomy, including a torso 110 coupled to a plurality of components including head 111, right arm 112, right leg 113, left arm 114, left leg 115, right end-effector 116, left end-effector 117, right foot 118, and left foot 119, which approximate anatomical features. More or fewer anatomical features could be included as appropriate for a given application. Further, how closely a robot approximates human anatomy can also be selected as appropriate for a given application.

Each of components 110, 111, 112, 113, 114, 115, 116, 117, 118, and 119 can be actuatable relative to other components. Any of these components which is actuatable relative to other components can be called an actuatable member. Actuators, motors, or other movement devices can couple together actuatable components. Driving said actuators, motors, or other movement driving mechanism causes actuation of the actuatable components. For example, rigid limbs in a humanoid robot can be coupled by motorized joints, where actuation of the rigid limbs is achieved by driving movement in the motorized joints.

End effectors 116 and 117 are shown in FIG. 1 as grippers, but any end effector could be used as appropriate for a given application. For example, end effectors can be hand-shaped members.

Right leg 113 and right foot 118 can together be considered as a support member and/or a locomotion member, in that the leg 113 and foot 118 together can support robot body 101 in place, or can move in order to move robot body 101 in an environment (i.e. cause robot body 101 to engage in locomotion). Left leg 115 and left foot 119 can similarly be considered as a support member and/or a locomotion member. Legs 113 and 115, and feet 118 and 119 are exemplary support and/or locomotion members, and could be substituted with any support members or locomotion members as appropriate for a given application. For example, FIG. 2 illustrates wheels as exemplary locomotion members instead of legs and feet.

Robot system 100 in FIG. 1 includes a robot body 101 that closely approximates human anatomy, such that input to or control of robot system 100 can be provided by an operator performing an action, to be replicated by the robot body 101 (e.g. via a tele-operation suit or equipment). In some implementations, it is possible to even more closely approximate human anatomy, such as by inclusion of actuatable components in a face on the head 111 of robot body 101, or with more detailed design of hands or feet of robot body 101, as non-limiting examples. However, in other implementations a complete approximation of the human anatomy is not required, and a robot body may only approximate a portion of human anatomy. As non-limiting examples, only an arm of human anatomy, only a head or face of human anatomy; or only a leg of human anatomy could be approximated.

Robot system 100 is also shown as including sensors 120, 121, 122, 123, 124, and 125 which collect context data representing an environment of robot body 101. In the example, sensors 120 and 121 are image sensors (e.g. cameras) that capture visual data representing an environment of robot body 101. Although two image sensors 120 and 121 are illustrated, more or fewer image sensors could be included. Also in the example, sensors 122 and 123 are audio sensors (e.g. microphones) that capture audio data representing an environment of robot body 101. Although two audio sensors 122 and 123 are illustrated, more or fewer audio sensors could be included. In the example, haptic (tactile) sensors 124 are included on end effector 116, and haptic (tactile) sensors 125 are included on end effector 117. Haptic sensors 124 and 125 can capture haptic data (or tactile data) when objects in an environment are toughed or grasped by end effectors 116 or 117. Haptic or tactile sensors could also be included on other areas or surfaces of robot body 101. Three types of sensors are illustrated in the example of FIG. 1, though more or fewer sensor types could be included. For example, audio sensors may not be included. As another example, other sensor types, such as accelerometers, inertial sensors, gyroscopes, temperature sensors, humidity sensors, pressure sensor, radiation sensors, or any other appropriate types of sensors could be included. Further, although sensors 120 and 121 are shown as approximating human eyes, and sensors 122 and 123 are shown as approximating human ears, sensors 120, 121, 122, and 123 could be positioned in any appropriate locations and have any appropriate shape.

Throughout this disclosure, reference is made to "haptic" sensors, "haptic" feedback, and "haptic" data. Herein, "haptic" is intended to encompass all forms of touch, physical contact, or feedback. This can include (and be limited to, if appropriate) "tactile" concepts, such as texture or feel as can be measured by a tactile sensor. "Haptic" can also include (and be limited to, if appropriate), force-related aspects of touch, such as force-feedback, resilience, or weight of an element, as could be measured by torque or force sensor of an actuatable member which causes touching of the element. "Haptic" can also include (and be limited to, if appropriate) "proprioceptive" aspects of touch, such as kinesthesia, motion, rotation, or inertial effects experienced when a member of a robot touches an element, as can be measured by sensors such as an Inertial measurement unit (IMU), and accelerometer, a gyroscope, or any other appropriate sensor.

Robot system 100 is also illustrated as including at least one processor 131, communicatively coupled to at least one non-transitory processor-readable storage medium 132. The at least one processor 131 can control actuation of components 110, 111, 112, 113, 114, 115, 116, 117, 118, and 119; can receive and process data from sensors 120, 121, 122, 123, 124, and 125; can determine context of the robot body 101, and can access, construct, or refine an environment model, among other possibilities. The at least one non-transitory processor-readable storage medium 132 can have processor-executable instructions or data stored thereon, which when executed by the at least one processor 131 can cause robot system 100 to perform any of the methods discussed herein. Further, the at least one non-transitory processor-readable storage medium 132 can store sensor data, classifiers, or any other data as appropriate for a given application. Further still, the at least one non-transitory processor-readable storage medium 132 can store environment models, such as those discussed later with reference to FIGS. 4B, 7A, 7B, 9, 10A, 10B, 11B, 11C, and 12. The at least one processor 131 and the at least one processor-readable storage medium 132 together can be considered as components of a "robot controller" 130, in that they control operation of robot system 100 in some capacity. While the at least one processor 131 and the at least one processor-readable storage medium 132 can perform all of the respective functions described in this paragraph, this is not necessarily the case, and the "robot controller" 130 can be or further include components that are remote from robot body 101. In particular, certain functions can be performed by at least one processor or at least one non-transitory processor-readable storage medium remote from robot body 101, as discussed later with reference to FIG. 3.

In some implementations, it is possible for a robot body to not approximate human anatomy. FIG. 2 is an elevated side view of a robot system 200 including a robot body 201 which does not approximate human anatomy, in accordance with another implementation of the present systems, methods, and computer program products. Robot body 201 includes a base 210, having actuatable components 211, 212, 213, and 214 coupled thereto. In the example, actuatable components 211 and 212 are wheels (locomotion members) which support robot body 201, and provide movement or locomotion capabilities to the robot body 201. Actuatable components 213 and 214 are a support arm and an end effector, respectively. The description for end effectors 116 and 117 in FIG. 1 is applicable to end effector 214 in FIG. 2. End effector 214 can also take other forms, such as a hand-shaped member. In other examples, other actuatable components could be included.

Robot system 200 also includes sensor 220, which is illustrated as an image sensor. Robot system 200 also includes haptic sensors 221 positioned on end effector 214. The description pertaining to sensors 120, 121, 122, 123, 124, and 125 in FIG. 1 is also applicable to sensors 220 and 221 in FIG. 2 (and is applicable to inclusion of sensors in robot bodies in general). End effector 214 can be used to touch, grasp, or manipulate objects in an environment. Further, any number of end effectors could be included in robot system 200 as appropriate for a given application or implementation.

Robot system 200 is also illustrated as including a local or on-board robot controller 230 comprising at least one processor 231 communicatively coupled to at least one non-transitory processor-readable storage medium 232. The at least one processor 231 can control actuation of components 210, 211, 212, 213, and 214; can receive and process data from sensors 220 and 221; and can determine context of the robot body 201 and can access, construct, populate, or refine an environment model, among other possibilities. The at least one non-transitory processor-readable storage medium 232 can store processor-executable instructions or data that, when executed by the at least one processor 231, can cause robot body 201 to perform any of the methods discussed herein. Further, the at least one processor-readable storage medium 232 can store sensor data, classifiers, or any other data as appropriate for a given application. Further still, the at least one non-transitory processor-readable storage medium 232 can store environment models, such as those discussed later with reference to FIGS. 4B, 7A, 7B, 9, 10A, 10B, 11B, 11C, and 12.

FIG. 3 is a schematic diagram illustrating components of a robot system 300 comprising a robot body 301 and a physically separate remote device 350 in accordance with the present systems, methods, and computer program products.

Robot body 301 is shown as including at least one local or on-board processor 302, a non-transitory processor-readable storage medium 304 communicatively coupled to the at least one processor 302, a wireless communication interface 306, a wired communication interface 308, at least one actuatable component 310, at least one sensor 312, and at least one haptic sensor 314. However, certain components could be omitted or substituted, or elements could be added, as appropriate for a given application. As an example, in many implementations only one communication interface is needed, so robot body 301 may include only one of wireless communication interface 306 or wired communication interface 308. Further, any appropriate structure of at least one actuatable portion could be implemented as the actuatable component 310 (such as those shown in FIGS. 1 and 2, for example). For example, robot body 101 as described with reference to FIG. 1, or robot body 201 described with reference to FIG. 2, could be used in place of robot body 301, and communication interface 306 or communication interface 308 could be implemented therein to enable communication with remote device 350. Further still, the at least one sensor 312 and the at least one haptic sensor 314 can include any appropriate quantity or type of sensor, as discussed with reference to FIGS. 1 and 2.

Remote device 350 is shown as including at least one processor 352, at least one non-transitory processor-readable medium 354, a wireless communication interface 356, a wired communication interface 308, at least one input device 358, and an output device 360. However, certain components could be omitted or substituted, or elements could be added, as appropriate for a given application. As an example, in many implementations only one communication interface is needed, so remote device 350 may include only one of wireless communication interface 356 or wired communication interface 308. As another example, input device 358 can receive input from an operator of remote device 350, and output device 360 can provide information to the operator, but these components are not essential in all implementations. For example, remote device 350 can be a server which communicates with robot body 301, but does not require operator interaction to function. Additionally, output device 360 is illustrated as a display, but other output devices are possible, such as speakers, as a non-limiting example. Similarly, the at least one input device 358 is illustrated as a keyboard and mouse, but other input devices are possible.

In some implementations, the at least one processor 302 and the at least one processor-readable storage medium 304 together can be considered as a "robot controller", which controls operation of robot body 301. In other implementations, the at least one processor 352 and the at least one processor-readable storage medium 354 together can be considered as a "robot controller" which controls operation of robot body 301 remotely. In yet other implementations, that at least one processor 302, the at least one processor 352, the at least one non-transitory processor-readable storage medium 304, and the at least one processor-readable storage medium 354 together can be considered as a "robot controller" (distributed across multiple devices) which controls operation of robot body 301. "Controls operation of robot body 301" refers to the robot controller's ability to provide control instructions or data for operation of the robot body 301 to the robot body 301. In some implementations, such instructions could be explicit instructions which control specific actions of the robot body 301. In other implementations, such instructions or data could include broader instructions or data which guide the robot body 301 generally, where specific actions of the robot body 301 are controlled by a control unit of the robot body 301 (e.g. the at least one processor 302), which converts the broad instructions or data to specific action instructions. In some implementations, a single remote device 350 may communicatively link to and at least partially control multiple (i.e., more than one) robot bodies. That is, a single remote device 350 may serve as (at least a portion of) the respective robot controller for multiple physically separate robot bodies 301.

FIGS. 1, 2, and 3 each illustrate robot bodies having at least one haptic sensor (sensors 124 and 125 in FIG. 1, sensor 221 in FIG. 2, and sensor 314 in FIG. 3). However, such haptic sensors are not necessarily required, and can be omitted in some implementations.

FIG. 4A is a scene view which illustrates an exemplary environment 410 in which a robot body 490 is positioned. Environment 410 includes at least display 411 behind robot body 490, shelving units 412 and 413 to the sides of robot body 490, a table 414 in front of robot body 490, and a brush 415 on table 414. The foregoing does not describe every feature or element illustrated in environment 410, but rather describes some prominent features to provide insight into what is shown in FIG. 4A.

Figure 4B:
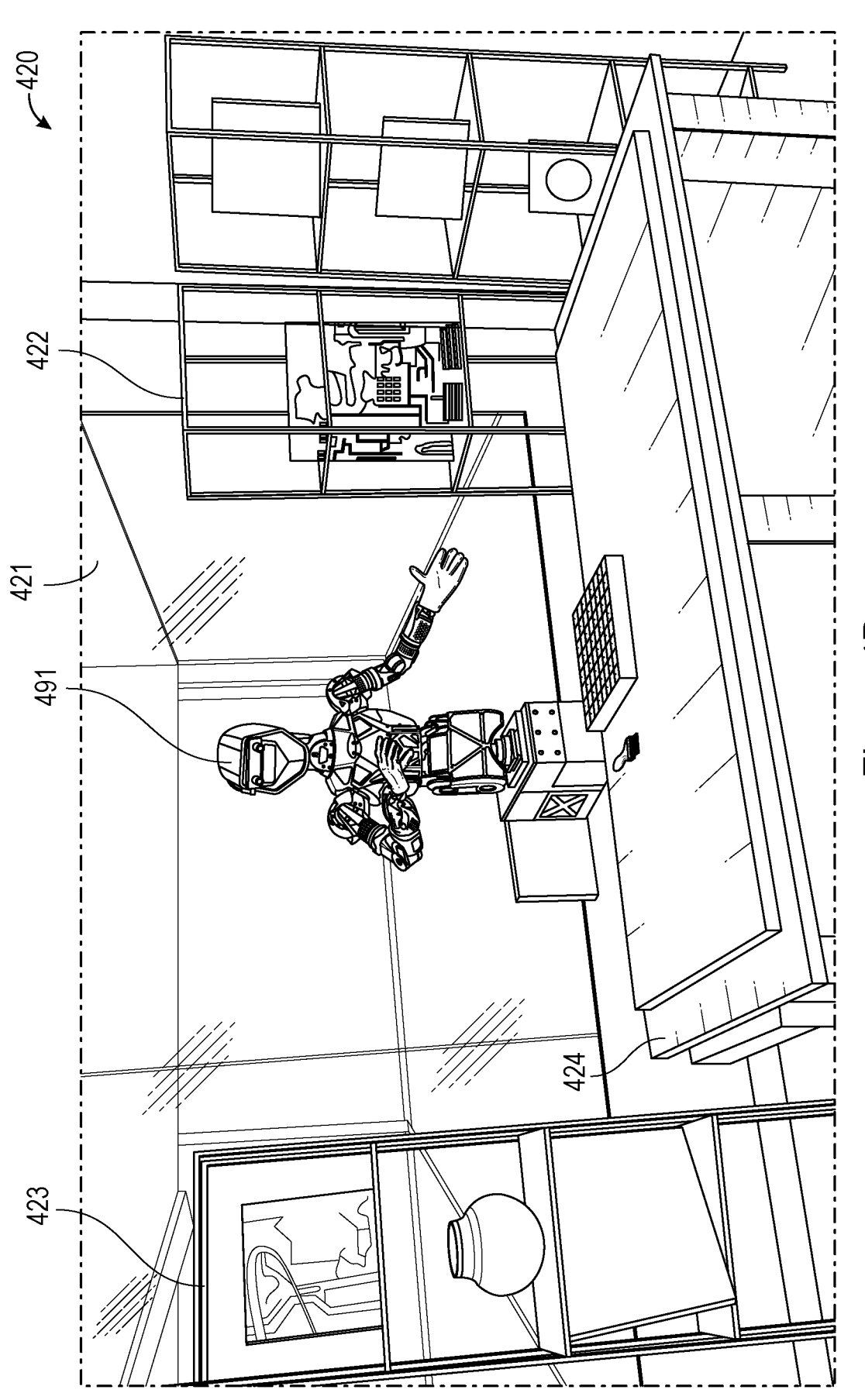
FIG. 4B is a scene view of an environment model which represents the environment shown in FIG. 4A.

FIG. 4B is a scene view which illustrates a virtual environment model 420 which represents environment 410 in FIG. 4A. Environment model 420 includes representation 491, which is a virtual model of robot 490 in FIG. 4A. Environment model 420 includes representation 421 of display 411 behind representation 491 of robot body 490, representations 422 and 423 of shelving units 412 and 413 to the sides of representation 491 of robot body 490, representation 424 of table 414 in front of representation 491 of robot body 490, and representation 425 of brush 415 on representation 424 of table 414. Environment model 420 can include a visually rendered representation 491 of robot body 490, such that when robot body 490 is operated at least partially based on environment model 420, robot body 490 can be "seen" as representation 491 in environment model 420. Alternatively, environment model 420 can specify representation 491 as a spatial representation of robot body 490 (even if not visually rendered) where elements in the environment model 420 are specified relative to a position of representation 491 of robot body 490. In this way representation 491 of robot body 490 may not be visually "seen" as representation 491, but locations of elements relative to the position of representation 491 can still be understood.

FIGS. 4A and 4B visually illustrate an environment model representing an environment, and such an environment model can be constructed, generated, populated, and/or refined based on collected data. In some implementations, environment 410 in FIG. 4A is a physical (real-world) environment comprising physical objects. In such implementations, data can be collected by physical systems or devices (e.g. by at least one image sensor of robot body 490, or by at least one image sensor of another device or robot), and used for construction or population of environment model 420 in FIG. 4B. In other implementations, environment 410 in FIG. 4A is a virtual environment comprising virtual objects. In such implementations, data can be virtually "collected" by simulated systems or devices (e.g. by at least one virtual image sensor of a virtual robot body 490, or by at least one virtual image sensor of another virtual device or virtual robot), and used for construction or population of environment model 420 in FIG. 4B. Generating or populating an environment model of a virtual environment is useful for example in training and/or deploying an artificial intelligence. An environment model is useful for a robot body (virtual or real) to navigate and operate within an environment which the environment model represents.

Figure 5A:
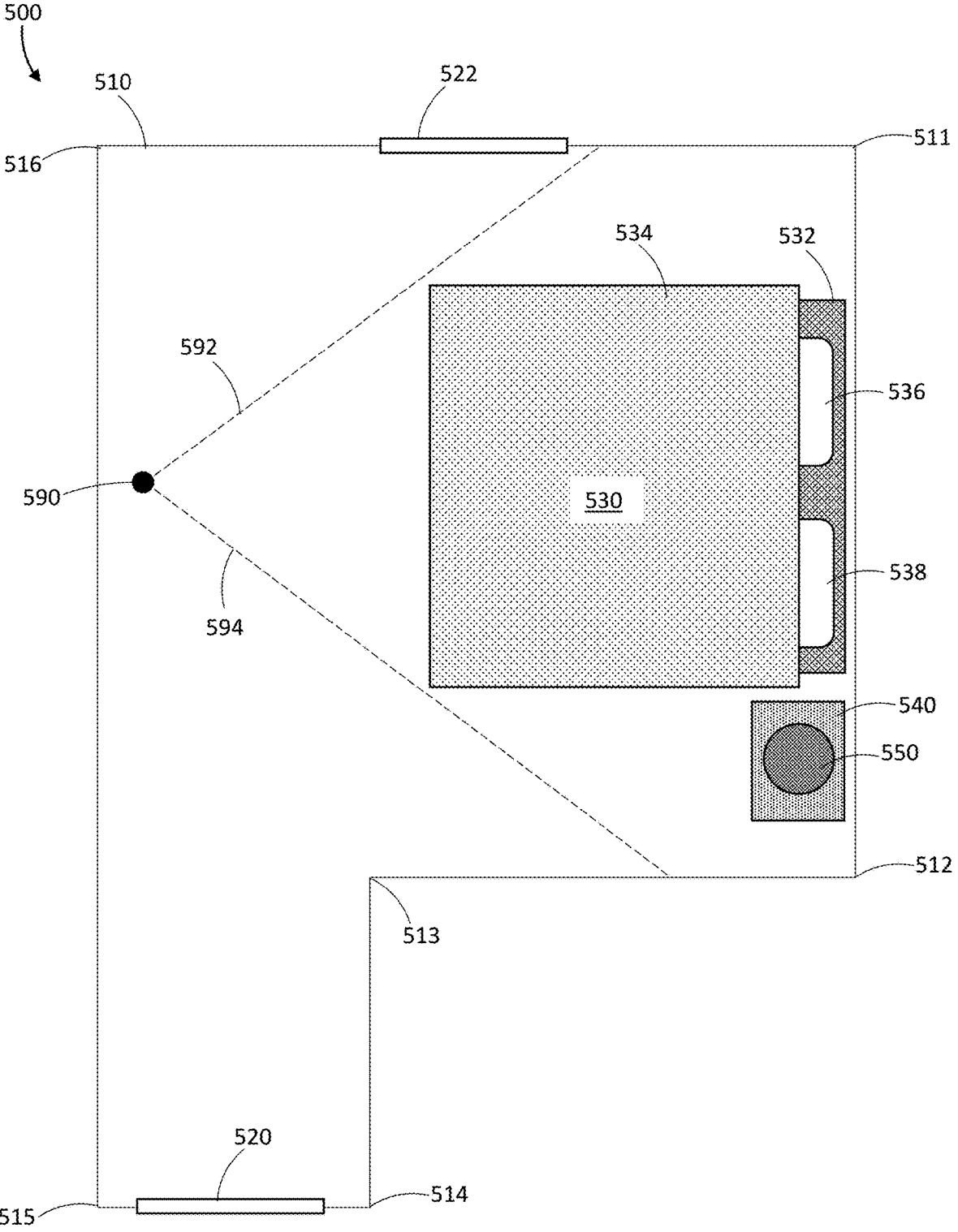
FIG. 5A is a top view of another environment.
Figure 5B:
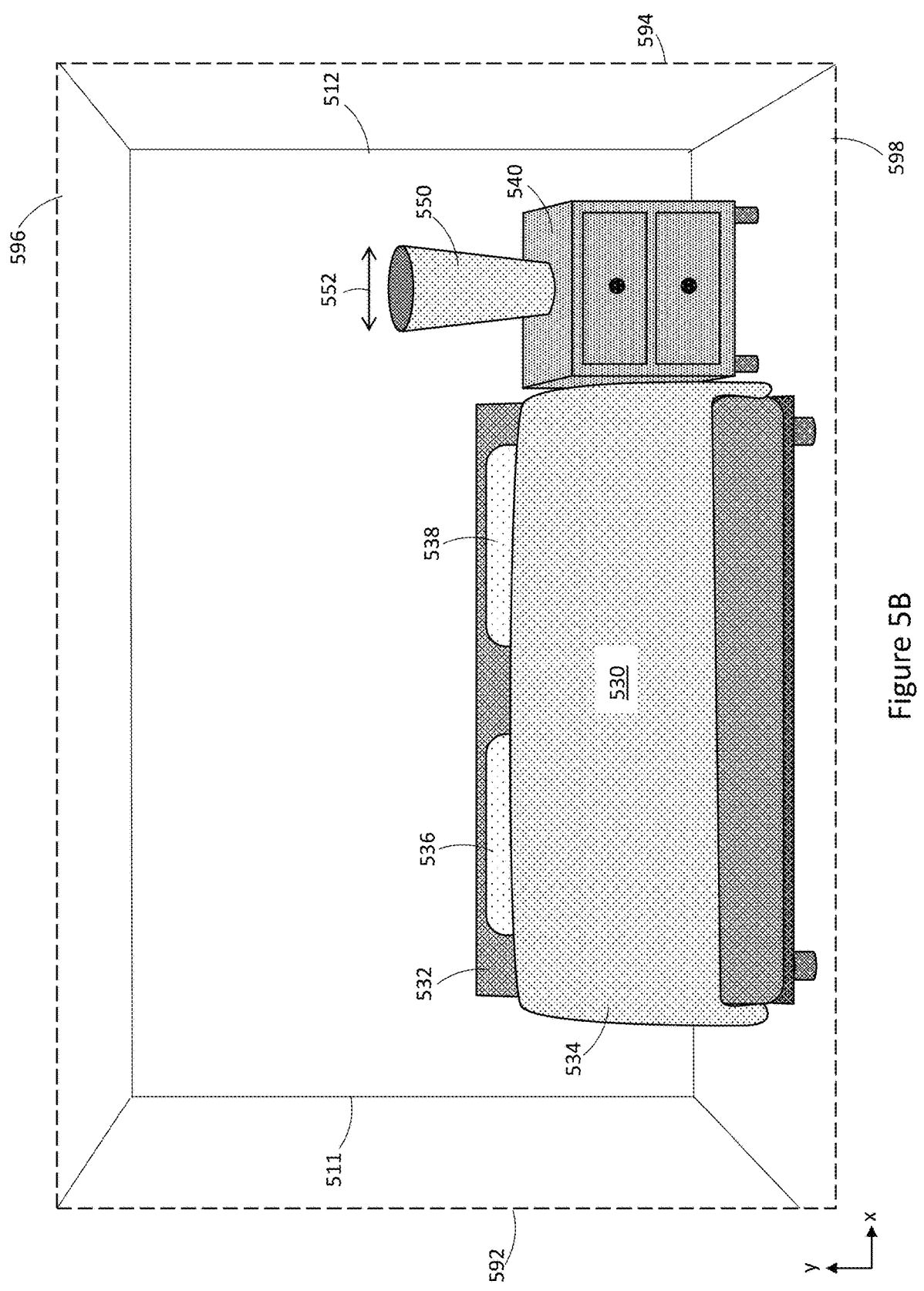
FIG. 5B is a scene view of the environment shown in FIG. 5A.

FIGS. 5A and 5B discussed below illustrate an exemplary environment 500, which is used in a non-limiting capacity to illustrate the systems, methods, and computer program products discussed herein.

FIG. 5A is a top view which shows environment 500 from above. Environment 500 includes a room 510, which is illustrated as a bedroom (such as in a residence, or in a hotel, as non-limiting examples). Room 510 is bounded by walls between corners 511, 512, 513, 514, 515, and 516. Room 510 is also shown as having a door 520 and a window 522. A bed 530 is also illustrated in room 510. Bed 530 is shown as including a mattress 532, with a pillow 536 and another pillow 538 thereon. Bed 530 is further shown as including a blanket 534 spread over mattress 532 and pillows 536 and 538. Room 510 is further shown as including a nightstand 540, having a vase 550 positioned thereon.

A first vantage point 590 is shown in FIG. 5A, from which a first view of the environment 500 (or room 510) is visible. The first vantage point 590 has a position and a perspective in relation to the environment 500. In the illustrated example, the first vantage point 590 is positioned within the environment 500 (within room 510), and is facing towards the right in relation to the top view of FIG. 5A. The resulting first view is illustrated by view boundaries 592 and 594. In practice, the first view could comprise a larger or smaller area, as appropriate for a given application. In other examples, the first vantage point 590 does not necessarily need to be positioned within the environment 500, but could instead be positioned adjacent to the environment 500, even spatially separated from the environment 500. In such examples, the perspective of the first vantage point faces at least partially towards the environment, such that the resulting first view includes at least a partial representation of the environment.

In some implementations, environment 500 is a physical (real-world) environment, and the first view is represented by image data captured by at least one image sensor included in a device (such as a robot body, in a non-limiting example) positioned at first vantage point 590, which can capture image data within the view boundaries 592 and 594. In other implementations, the first view is a virtual view simulated as being visible from first vantage point 590, within the view boundaries 592 and 594.

FIG. 5B is a scene view of the first view discussed with reference to FIG. 5A, from the first vantage point 590. The first view in FIG. 5B is shown as bounded on the left by view boundary 592, bounded on the right by view boundary 594, bounded on the top by view boundary 596, and bounded on the bottom by view boundary 598. As discussed earlier, the view boundaries are merely exemplary. The first view could encompass a larger or smaller field of view as appropriate for a given application.

FIG. 5B also shows corners 511 and 512 of room 510. Further, FIG. 5B also shows bed 530 including mattress 532, blanket 534, and pillows 536 and 538 as discussed earlier. Further still, FIG. 5B also shows nightstand 540 and vase 550 positioned thereon. FIG. 5B shows vase 550 as having a first dimension 552 (as seen in the first view), which is discussed later with reference to FIG. 9.

Environment 500 as illustrated in FIGS. 5A and 5B is used to exemplify population of an environment model, as discussed below with reference to FIG. 6.

FIG. 6 is a flowchart diagram showing an exemplary method 600 of managing an environment model, and in particular a method of populating at least one instance of an object in the environment model, in accordance with the present systems, methods, and computer program products. Method 600 could be implemented to manage an environment model in many different applications, such as augmented or virtual reality, video games, or robotics. The examples discussed herein particularly focus on robotics applications, but the disclosure is also applicable to broader applications.

Method 600 pertains to operation of a system, which includes at least one processor and at least one non-transitory processor-readable storage medium communicatively coupled to the at least one processor. The at least one processor-readable storage medium stores data (including, e.g., at least one environment model and/or a library of object models) and/or processor-executable instructions that, when executed by the at least one processor, cause the system to perform the method. In the exemplary implementations discussed hereafter, the system comprises a robot, which can include a robot body such as those illustrated in FIGS. 1, 2, and 3, and optionally can include a remote device such as that illustrated in FIG. 3. Certain acts of method 600 may be performed by at least one processor or processing unit (hereafter "processor") positioned at the robot body (or at a remote device), and communicatively coupled to a non-transitory processor-readable storage medium positioned at the robot body (or at a remote device), as discussed above with reference to FIGS. 1, 2, and 3. The robot body may communicate, via communications and networking hardware communicatively coupled to the robot body's at least one processor, with remote systems and/or remote non-transitory processor-readable storage media, as discussed above with reference to FIG. 3. Thus, unless the specific context requires otherwise, references to a robot system's processor, non-transitory processor-readable storage medium, as well as data and/or processor-executable instructions stored in a non-transitory processor-readable storage medium, are not intended to be limiting as to the physical location of the processor or non-transitory processor-readable storage medium in relation to the robot body and the rest of the robot hardware. In other words, a robot system's processor or non-transitory processor-readable storage medium may include processors or non-transitory processor-readable storage media located on-board the robot body and/or non-transitory processor-readable storage media located remotely from the robot body, unless the specific context requires otherwise. Further, a method of operation of a system such as method 600 can be implemented as a computer program product. Such a computer program product comprises a non-transitory processor-readable storage medium storing processor-executable instructions or data that, when the computer program product is loaded onto or by the system and the computer program product is executed by at least one processor of the system, the computer program product (or the processor-executable instructions or data thereof) cause the system to perform acts of the method.

Returning to FIG. 6, method 600 as illustrated includes acts 602, 604, 606, 610, 612, 614, and 616, though those of skill in the art will appreciate that in alternative implementations certain acts may be omitted and/or additional acts may be added. Those of skill in the art will also appreciate that the illustrated order of the acts is shown for exemplary purposes only and may change in alternative implementations. As shown in FIG. 6, acts 612, 614, and 616 can be sub-acts of act 610.

At 602, an environment model representation of an environment is accessed. As an example, the environment could be such as environment 410 illustrated in FIG. 4A, and the environment model could be a model of the environment such as environment model 420 illustrated in FIG. 4B. In some implementations, the environment model could be stored on a non-transitory processor-readable medium at a robot body, and be accessed by at least one processor of the robot body. In other implementations, the environment model could be stored remotely from the robot body (e.g. at a server or other remote device), and could be accessed via a communication interface between the robot body and the remote device.

In some implementations, the act of "accessing" the environment model in and of itself could comprise generation of the environment model. For example, the environment model corresponding to a particular environment may not be created yet, and so the device (e.g. robot system) which "accesses" the environment model first generates the environment model. Such generation of the environment model can be based on sensor data collected by at least one sensor of the device (e.g. at least one image sensor, at least one haptic sensor, or any other appropriate sensor). In other implementations, the environment model is generated in advance of the accessing. For example, sensor data is gathered by at least one sensor of a device (e.g. another device or another robot system) operable in or proximate the environment, for generation of the environment model, and the at least one processor of the originally discussed device accesses said environment model.

Figure 7A:
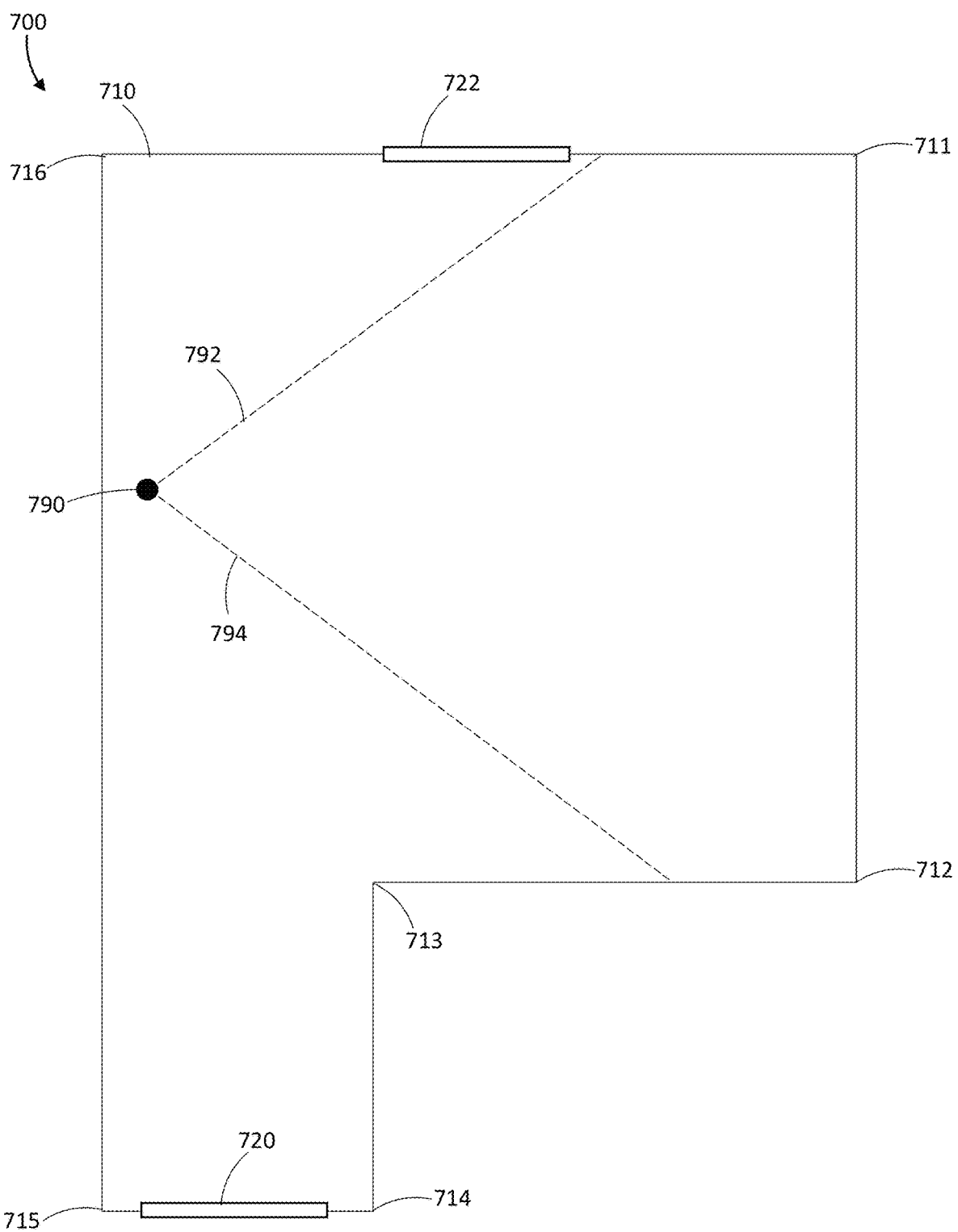
FIG. 7A is a top view of an environment model.
Figure 7B:
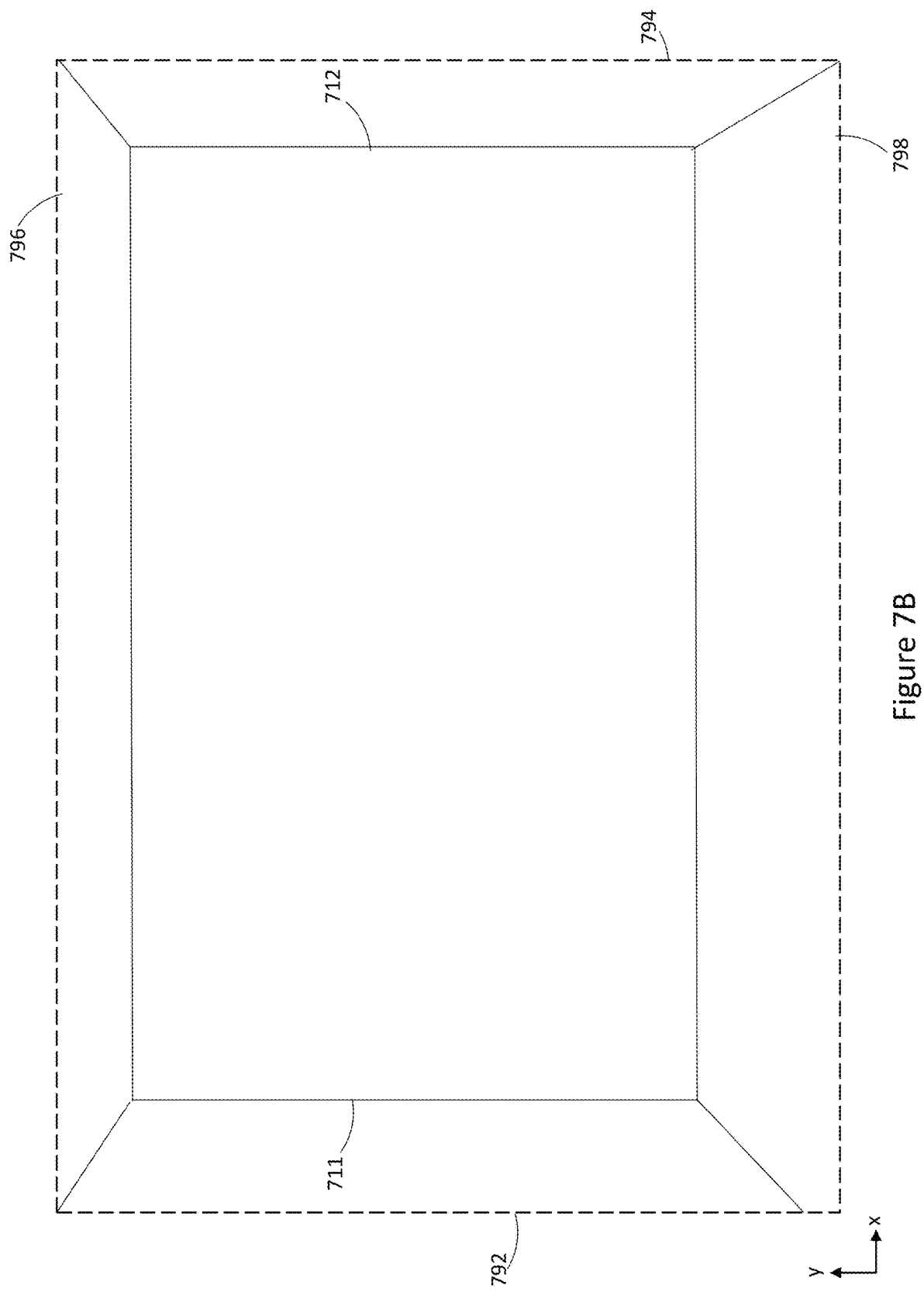
FIG. 7B is a scene view of the environment model shown in FIG. 7A.

With reference to environment 500 illustrated in FIGS. 5A and 5B, in an exemplary use case for a hotel cleaning robot (or fleet of hotel cleaning robots), an environment model may be pre-generated prior to method 600, and this environment model may be accessible to relevant hotel cleaning robots in the fleet. FIGS. 7A and 7B illustrate the pre-generated environment model 700, which represents environment 500 in FIGS. 5A and 5B, for this exemplary use case.

FIG. 7A is a top view of environment model 700, which shows environment model 700 from above. Environment model 700 represents environment 500 and includes room representation 710 representing room 510. In the exemplary use case of a hotel, environment model 700 may represent a plurality of different rooms having similar shape or construction. Room representation 710 is bounded by walls between corners 711, 712, 713, 714, 715, and 716 (representing corners 511, 512, 513, 514, 515, and 516, respectively, in environment 500). Room representation 710 is also shown as including door representation 720 (representing door 520) and window representation 722 (representing window 522). However, in the initial state illustrated in FIGS. 7A and 7B, environment model 700 does not include representations of bed 530, nightstand 540, or vase 550. In this exemplary use case, relatively permanent features of environment 500 (features structurally fixed in the environment 500) are initially included in environment model 700, whereas relatively non-permanent features or objects are not initially included in the environment model 700. This is because a hotel guest may move, displace, or break such non-permanent features or objects, or such non-permanent features or objects may not be the same between different rooms which environment model 700 represents, such that representations thereof in the environment model may not be reliable or consistent. On the other hand, permeant features such as walls, windows, or doors are unlikely to be different between rooms having the same layout or be changed by guests, and therefore can be reliably modelled without relying on sensory detection. That is, in this exemplary use case, FIGS. 7A and 7B illustrate environment model 700 as a "base" environment model, which can be accessed as needed by robots in a fleet, where the base environment model initially only includes relatively permanent objects or features, and relatively non-permanent objects or features are populated by a robot in the fleet after accessing the environment model. In other implementations, non-permanent features or objects can be represented in environment model 700 (in the base environment model as shown in FIGS. 7A and 7B), and a robot system which operates at a given room can update or modify the environment model as needed if the position or state of any particular non-permanent features are not accurately represented in environment model 700.

A second vantage point 790 is shown in FIG. 7A, from which a second view of the environment model 700 (or room representation 710) is visible. The second vantage point 790 is not necessarily a feature represented in environment model 700, but rather is a position selected by a device or robot (e.g., by at least one processor thereof) in the environment model 700, to represent a corresponding position of the device or robot in the environment 500. That is, a position and perspective of the second vantage point 790 in relation to the environment model 700 substantially match the position and the perspective of the first vantage point 590 in relation to the environment 500. In this context, a position and perspective of the second vantage point 790 "substantially" matching a position and perspective of the first vantage point 590 refers to the second vantage point being similar enough to the first vantage point that the second view accurately represents that first view. For example, a position of the second vantage point 790 can be considered to "substantially" match a position of the first vantage point 590 if the second vantage point 790 is within a distance threshold of the first vantage point 590. Any distance threshold could be set, such as 1 centimeter, 10 centimeters, 1 meter, 10 meters, or any other distance, as appropriate for a given application. In other implementations, another threshold based on a property or properties other than distance may be used, such as an alignment threshold (e.g., pixel alignment or overlap as a percentage, such as within 1% or within 10%). As a similar example, a perspective of the second vantage point 790 can be considered to "substantially" match a perspective of the first vantage point 590 if the perspective of the second vantage point 790 is within an angular threshold of the perspective of the first vantage point 590. Any angular threshold could be set, such as 0.1 degree, 1 degree, 10 degrees, 20 degrees, or any other angle, as appropriate for a given application. Likewise, alternative thresholds may be used, such as an alignment threshold ((e.g., pixel alignment or overlap as a percentage, such as within 1% or within 10%).

The second view of the environment model is generated from the second vantage point 790, as is discussed later with reference to act 612 of method 600. The second view is illustrated by view boundaries 792 and 794 (corresponding to view boundaries 592 and 594 in FIG. 5A). In practice, the second view could comprise a larger or smaller area, as appropriate for a given application. It is preferable that the second view substantially matches the first view (or at least can be cropped or otherwise modified to match the first view). That is, it is preferable for a region of the environment model which is visible in the second view to encompass or closely approximate a region of the environment which is visible in the first view.

FIG. 7B is a scene view of the second view discussed with reference to FIG. 7A, from the second vantage point 790. The second view in FIG. 7B is shown as bounded on the left by the view boundary 792 (representing view boundary 592), bounded on the right by view boundary 794 (representing view boundary 594), bounded on the top by view boundary 796 (representing view boundary 596), and bounded on the bottom by view boundary 798 (representing view boundary 598). As discussed earlier, the view boundaries are merely exemplary, the second view could encompass a larger or smaller field of view as appropriate for a given application.

FIG. 7B also shows corners 711 and 712 (representing corners 511 and 512 of room 510). As discussed above regarding FIG. 7A, environment 700 illustrated in FIG. 7B does not include representations of bed 530, nightstand 540, or vase 550 (though such representations could be included in some implementations, as appropriate).

In the exemplary use case, in act 602, a hotel cleaning robot accesses an environment model 700 representing an empty room, and performs population of the empty room as discussed with reference to the remaining acts of method 600 in FIG. 6. In other implementations, more or fewer features and objects can be included in environment model 700, or environment model 700 may not be pre-generated at all, as discussed earlier.

Returning to method 600, at 604 a first view of the environment from the first vantage point is accessed. With reference to the example of FIGS. 5A and 5B, the first view from the first vantage point 590 is accessed. As discussed with reference to FIG. 5A, the first vantage point 590 has a position and perspective in relation to the environment (e.g. within the environment, adjacent to the environment, or outside the environment, facing at least partially towards the environment). In the examples of FIGS. 5A and 5B, FIG. 5B shows the first view of the environment 500 from the first vantage point 590. As shown in FIG. 5B, the first view includes at least one object in the environment 500 (in the example, bed 530, nightstand 540, and vase 550).

In some implementations, accessing the first view of the environment comprises accessing image data captured by at least one image sensor of a device (e.g. a robot body) positioned within or proximate the environment. Such image data could be accessed live from the at least one image sensor, or could be accessed in at least one processor-readable storage medium where the image data is stored. In other implementations, accessing the first view of the environment comprises accessing a simulated representation of the first view for a virtual environment. Such a simulated representation could be accessed live from at least one processor which is rendering the simulated representation, or could be accessed in at least one processor-readable storage medium where the simulated representation is stored.

At 604, and throughout method 600, "an object" in the environment is referred to. However, method 600 can be performed for multiple objects. In particular, method 600 can be iterated or repeated for each object of interest in the environment, either in series or in parallel.

At 606, an object model representation of the object included in the first view is accessed. The object model is accessed from a library of object models, and the object model includes dimension data indicative of at least one spatial dimension of the object. As an example, the library of object models can be stored in at least one non-transitory processor-readable storage medium at a device (e.g. robot body) in or proximate to the environment. As another example, the library of object models can be stored in at least one non-transitory processor-readable storage medium remote from the environment (e.g. at a remote robot controller).

Figure 8:
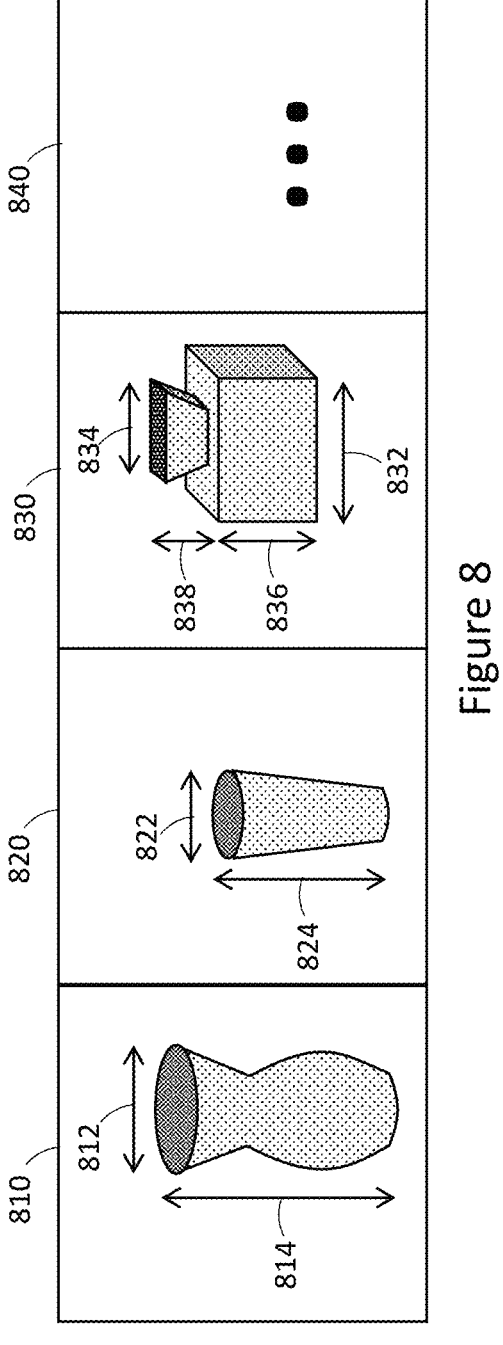
FIG. 8 is a user interface view of a library of object models.

FIG. 8 illustrates a portion of an exemplary library of object models. In particular, FIG. 8 illustrates a library of object models including a model 810 of a first type of vase, a model 820 of a second type of vase, and a model 830 of a third type of vase. Ellipses 840 illustrates that the plurality of object models can include more models, as appropriate for a given application. Each of models 810, 820, and 830 and ellipses 840 are illustrated within bounding boxes, which is representative of a user interface by which the library of object models can be viewed by a user. When accessed by at least one processor, such a user interface is not necessary. Although FIG. 8 only shows object models corresponding to different vases, any appropriate object models can be included in the library of models. For example, object models representing beds (such as bed 530 discussed earlier) or nightstands (such as nightstand 540 discussed earlier), or any other appropriate object models, can be included in the library of object models. In many use cases (such as the exemplary use case for hotel cleaning robots discussed above), objects within different environments where a device or robots operate may include many objects of the same type or design. For example, a hotel may have many vases of the same design, positioned throughout many rooms in the hotel.

Each of the object models shown in the library of object models in FIG. 8 includes spatial dimensions of an object represented by the object model. Vase model 810 is shown as having a height 814 and a diameter 812, and vase model 820 is shown as having a height 824 and diameter 822. Further, how many spatial dimensions are included in a model, and what each dimension represents, can be setup as appropriate for a particular model. For example, vase model 830 includes a width 832 of a base portion, a width 834 of a top portion, a height 836 of the base portion, and a height 838 of the base portion.

The above example discusses spatial dimensions as being explicitly labelled in models. However, in some implementations spatial dimensions are implicit or inherent to the model. For example, a unit size for the model is established (e.g. by a coordinate system or a unit vector), and the model is specified to scale, relative to the unit size.

In some cases, an object model is generated in the context of method 600. This is discussed later with reference to FIGS. 13A, 13B, 13C, and 14.

Returning again to method 600 in FIG. 6, at 610 the environment model is populated with an instance of the object model at a location in the environment model. Act 610 as shown includes sub-acts 612, 614, and 616, discussed in detail below.

At 612, a second view of the environment model is generated from the second vantage point. With reference to the example of FIGS. 7A and 7B, from the second vantage point 790, a second view is generated (i.e. the view shown in FIG. 7B is generated). Such generation of the second view can include rendering the second view by at least one processor or graphical processing unit. As discussed above with reference to FIGS. 7A and 7B, a position and perspective of the second vantage point in relation to the environment model substantially match the position and perspective of the first vantage point in relation to the environment. In this way, the second view of the environment model is representative of the first view of the environment.

At 614, the location in the environment model is identified where at least one spatial dimension of the instance of the object model in the second view of the environment model from the second vantage point substantially matches a corresponding spatial dimension of the object in the first view of the environment from the first vantage point. This concept is discussed below with reference to FIGS. 9, 10A, 10B, 11A, 11B, and 110.

Figure 9:
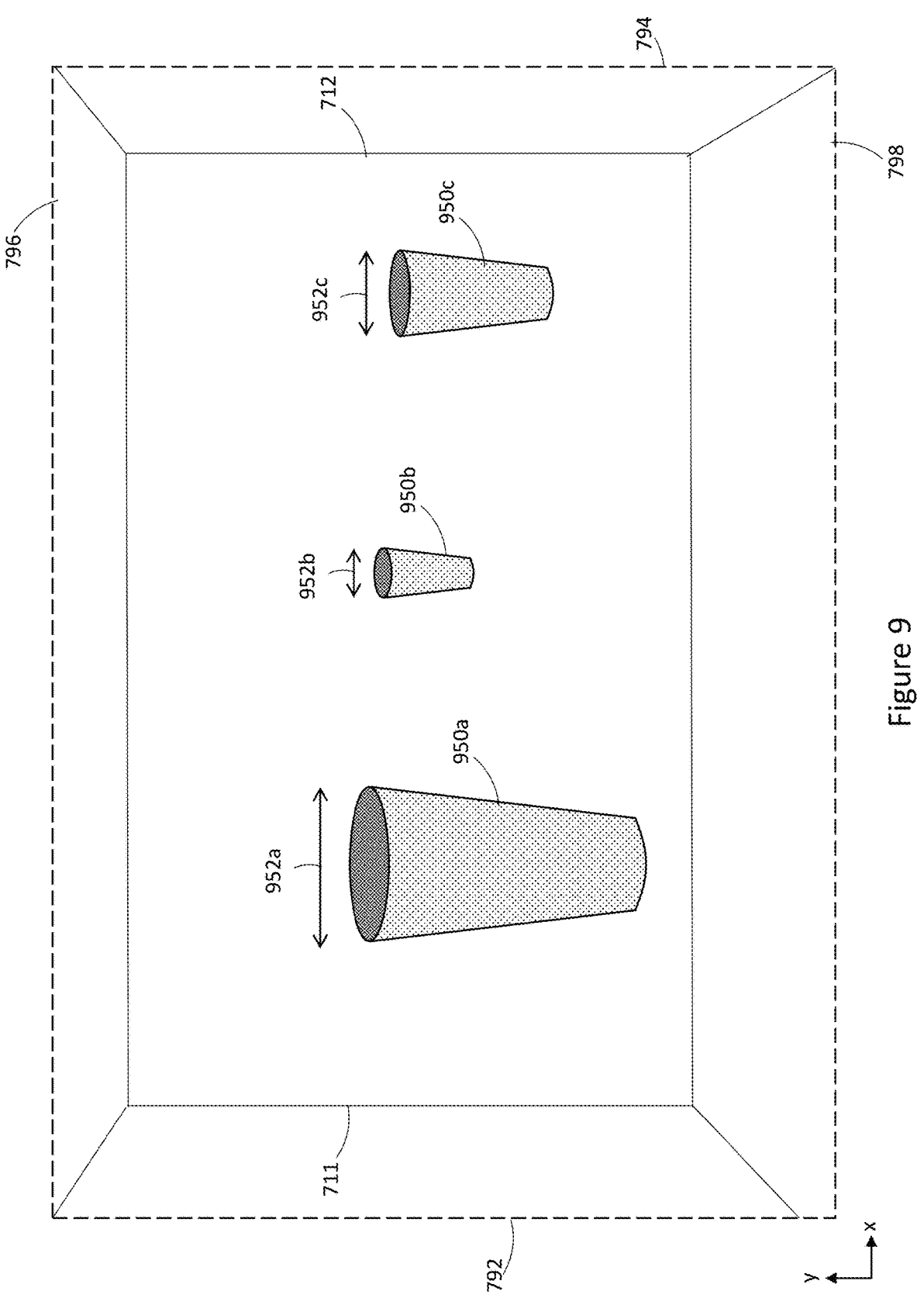
FIG. 9 is scene view of the environment model of FIGS. 7A and 7B, in process of being populated in accordance with one exemplary implementation.

FIG. 9 shows the second view of environment model 700, as discussed earlier with reference to FIG. 7B. In the example of FIG. 9, a location for an instance of a vase object model is being determined. To this end, FIG. 9 also shows instances of the vase object model at three different distances from the second vantage point 790. In the illustrative example of FIG. 9, the vase object model shown in FIG. 9 is object model 820 from the library of object models discussed with reference to FIG. 8, selected as representing the vase 550 in the environment 500 as shown in FIG. 5B. Due to perspective, difference in distance from the second vantage point 790 results in a different appearance of size in the second view. An instance 950a of the vase object model is shown close to the second vantage point 790, and is thus relatively large in size (shown by a large dimension 952a). An instance 950b of the vase object model is shown distant from the second vantage point 790 and is thus relatively small in size (shown by a small dimension 952b). An instance 950c of the vase object model is shown an inter-mediate distance from the second vantage point 790, and is thus intermediate in size (shown by an intermediate dimension 952c). The location in the environment model where an instance of the vase object model is positioned is determined as a location where a dimension of the instance of the vase object model in the second view substantially corresponds to a dimension of the vase 550 in the first view. That is, a location of the instance of the vase object model in the second view is selected such that a dimension of said instance of the vase object model in the second view substantially matches dimension 552 in FIG. 5B. In the case of FIG. 9, instance 950a has a dimension 952a which is much larger than dimension 552, and instance 950b has a dimension 952b which is much smaller than dimension 552. However, instance 950c has a dimension 952c which cor-responds to dimension 552. As such, instance 950c is determined as being the correct distance from the second vantage point 790, such that the determined location is at the distance of instance 950c of the vase object model from the second vantage point.

Determining a location where a spatial dimension of the instance of the object model in the second view "substan-tially" matches a corresponding spatial dimension of the object in the first view does not require that the spatial dimensions be determined as being equal. For example, the dimensions may be determined as "substantially" matching if they are within a threshold of each other. For example, the dimensions may be determined as substantially matching if the spatial dimension of the instance of the object model in the second view is within a 1%, 10%, or 20% difference to a corresponding spatial dimension of the object in the first view, as non-limiting examples.

Further, the location of the instance of the object model in the environment model can be refined by aligning a position of the object model in the second view with a position of the object in the first view. With reference to the exemplary first view in FIG. 5B and the second view in FIGS. 7B and 9, the horizontal direction can be considered an "x-axis" for the view, the vertical direction can be considered a "y-axis" for the view (as shown by axis indicators in each of these Figures), and a depth direction (in and out of the page) can be considered a "z-axis" for the view. In such an example, the location in the z direction is determined by matching a size (e.g., at least one spatial dimension) of the instance of the object model in the second view to a size (e.g., a corresponding at least one spatial dimension) of the object in the first view as discussed above. Further, the location in the x direction and the y direction is determined by aligning the instance of the object model in the second view with the position of the object in the first view.

FIG. 9 is an illustrative example of how distance from the second vantage point results in a difference in size in the second view, which can be used to determine a depth of the instance of the object model. However, it is not necessary to render a plurality of instances of an object model at different distances from the second vantage point (or even to render any instances of the object model at all) in order to deter-mine the depth at which to populate the environment model with the instance of the object model. In some implemen-tations, at least one dimension of the object in the first view is determined (e.g. dimension 552 of vase 550 is deter-mined), and the distance from the second vantage point which would result in the instance of the object model having a dimension which matches the determined dimen-sion is identified. This identification does not necessarily require an instance of the object to be rendered to be visible at the determination stage.

Other implementations for identifying location in the environment model are discussed below with reference to FIGS. 10A, 10B, 11A, 11B, and 110.

Figure 10A:
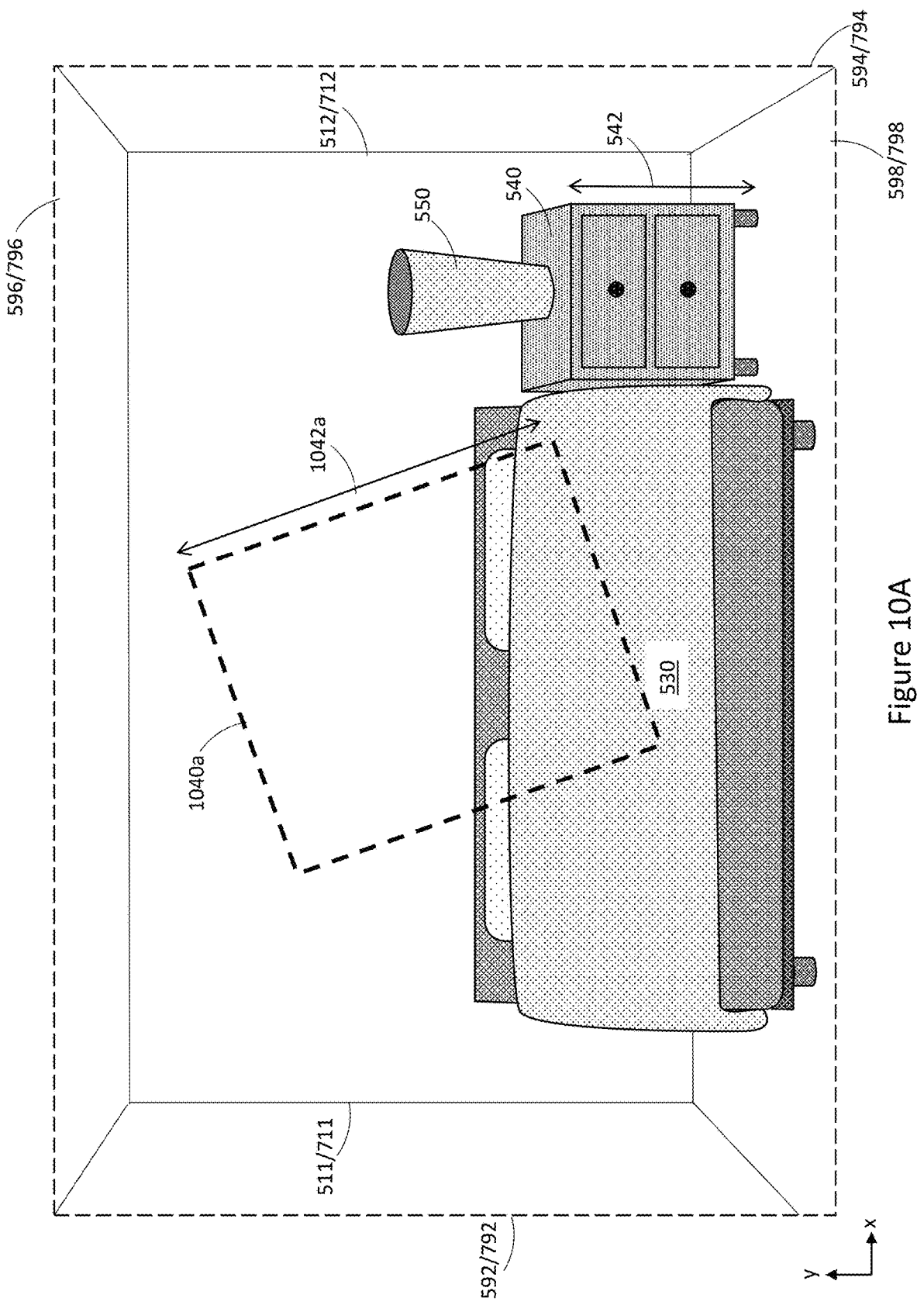
FIGS. 10A and 10B are scene views of the environment of FIGS. 5A and 5B, overlapped with the environment model of FIGS. 7A and 7B, where the environment model is in process of being populated in accordance with at least one exemplary implementation.
Figure 10B:
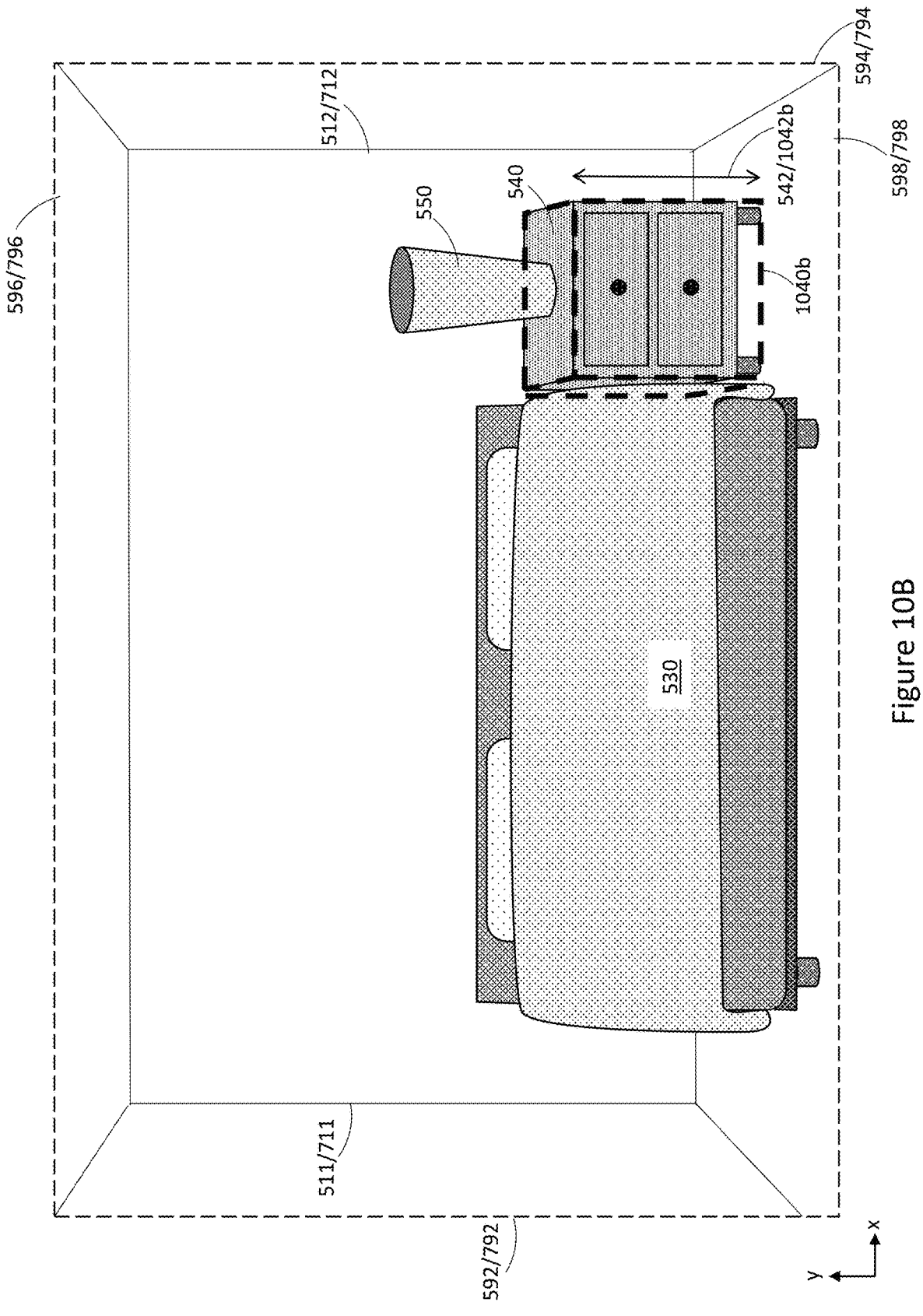

FIGS. 10A and 10B illustrate another exemplary use of method 600 to populate the environment model with an object. In the example of FIGS. 10A and 10B, environment model 500 is simultaneously illustrated with environment model 700; that is, environment 500 is shown as the first view from the first vantage point, and environment model 700 is shown as the second view from the second vantage point. Environment 500 and environment model 700 over-lap, because the position and perspective of the second vantage point 790 substantially match the position and perspective of the first vantage point 590 as discussed earlier.

Environment 500 is a three-dimensional environment, and environment model 700 is a three-dimensional environment model. In the example of FIGS. 10A and 10B, the first view comprises first two-dimensional image data representing the environment 500 from the first vantage point 590, and the second view comprises second two-dimensional image data representing the environment model 700 from the second vantage point 790. In the example, act 610 of method 600 further comprises, prior to identifying the location at 614, positioning the instance of the object model in the second image data to correspond to a position of the object in the first image data. Further in the example, act 610 of method 600 further comprises, prior to identifying the location at 614, orienting the instance of the object model in the second image data to correspond to an orientation of the object in the first image data.

In the examples of FIGS. 10A and 10B, the object which is being populated in the environment model is nightstand 540, shown in FIG. 10A as having a first dimension 542 as seen in the first view. FIG. 10A shows an instance 1040*a* corresponding to an object model representing the night-stand 540, and having a dimension 1042*a* corresponding to dimension 542. Instance 1040*a* is shown as a dotted outline to reduce clutter. In FIG. 10A, instance 1040*a* is not positioned in the second image data to correspond to a position of nightstand 540 in the first image data (instance 1040*a* is not aligned with nightstand 540). Further in FIG. 10A, instance 1040*a* is not oriented in the second image data to correspond to an orientation of nightstand 540 in the first image data (instance 1040*a* is askew compared to nightstand 540). Further still in FIG. 10A, dimension 1042*a* in the second image data does not substantially match dimension 542 in the first image data (instance 1040*a* is shown much larger than nightstand 540). In other words, in FIG. 10A instance 1040*a* is not positioned in the second image data to correspond to a depth of nightstand 540 in the first image data. FIG. 10B illustrates each of these differences being resolved. In particular, FIG. 10B shows instance 1040*b* of the object model representing nightstand 540, where instance 1040*b* has dimension 1042*b*. Instance 1040*b* can be the same instance as instance 1040*a* in FIG. 10A, but repositioned, resized, and reoriented to align with nightstand 540. In FIG. 10B, instance 1040*b* is shown positioned in the second image data in a position corresponding with night-stand 540 in the second image data (instance 1040*b* is aligned with nightstand 540). Further in FIG. 10B, instance 1040*b* is shown oriented in the second image data to correspond to an orientation of nightstand 540 in the first image data (instance 1040*b* is aligned with nightstand 540). Further still in FIG. 10B, instance 1040*b* is scaled such that dimension 1042*b* in the second image data substantially matches dimension 542 in the first image data (instance 1040*b* is sized to correspond to nightstand 540). In other words, in FIG. 10B, instance 1040*b* is shown positioned in the second image data to correspond to a depth of nightstand 540 in the first image data.

In some implementations, by positioning and/or orienting the instance of the object model to align with the object prior to determining the location at act 614 in method 600, scaling the instance of the object model to match the scale of the object can be easier or more accurate, thus providing a better determination of the location.

Similar to as described earlier with reference to FIG. 9, determining a location where a spatial dimension of the instance of the object model in the second image data "substantially" matches a corresponding spatial dimension of the object in the first image data does not require that the spatial dimensions be determined as being equal. For example, the dimensions may be determined as "substantially" matching if they are within a threshold of each other. For example, the dimensions may be determined as substantially matching if the spatial dimension of the instance of the object model in the second image data is within a 1%, 10%, or 20% difference to a corresponding spatial dimension of the object in the first image data, as non-limiting examples.

Figure 11A:
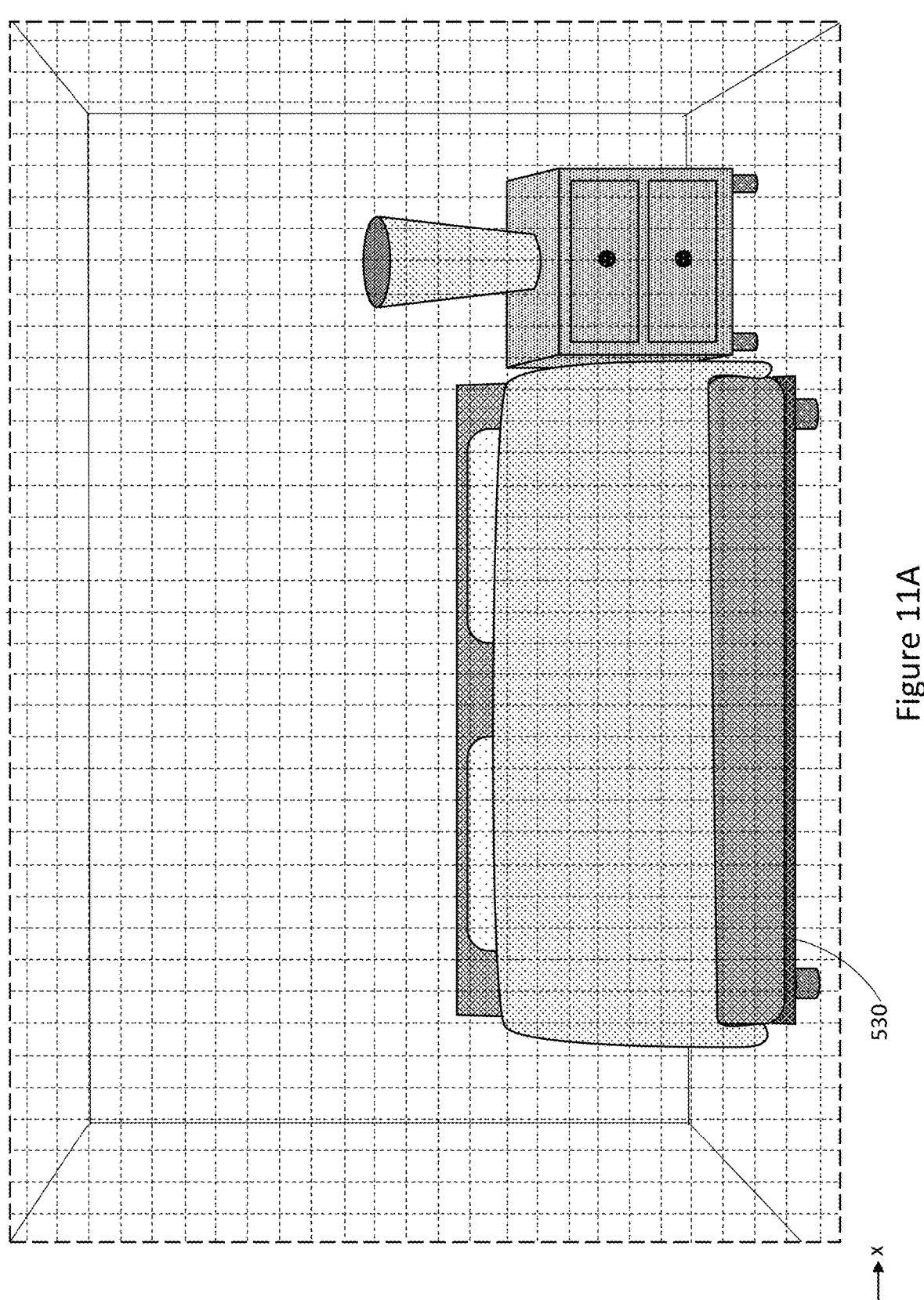
FIG. 11A is a scene view of the environment of FIGS. 5A and 5B, shown as image data comprising a grid of pixels.
Figure 11B:
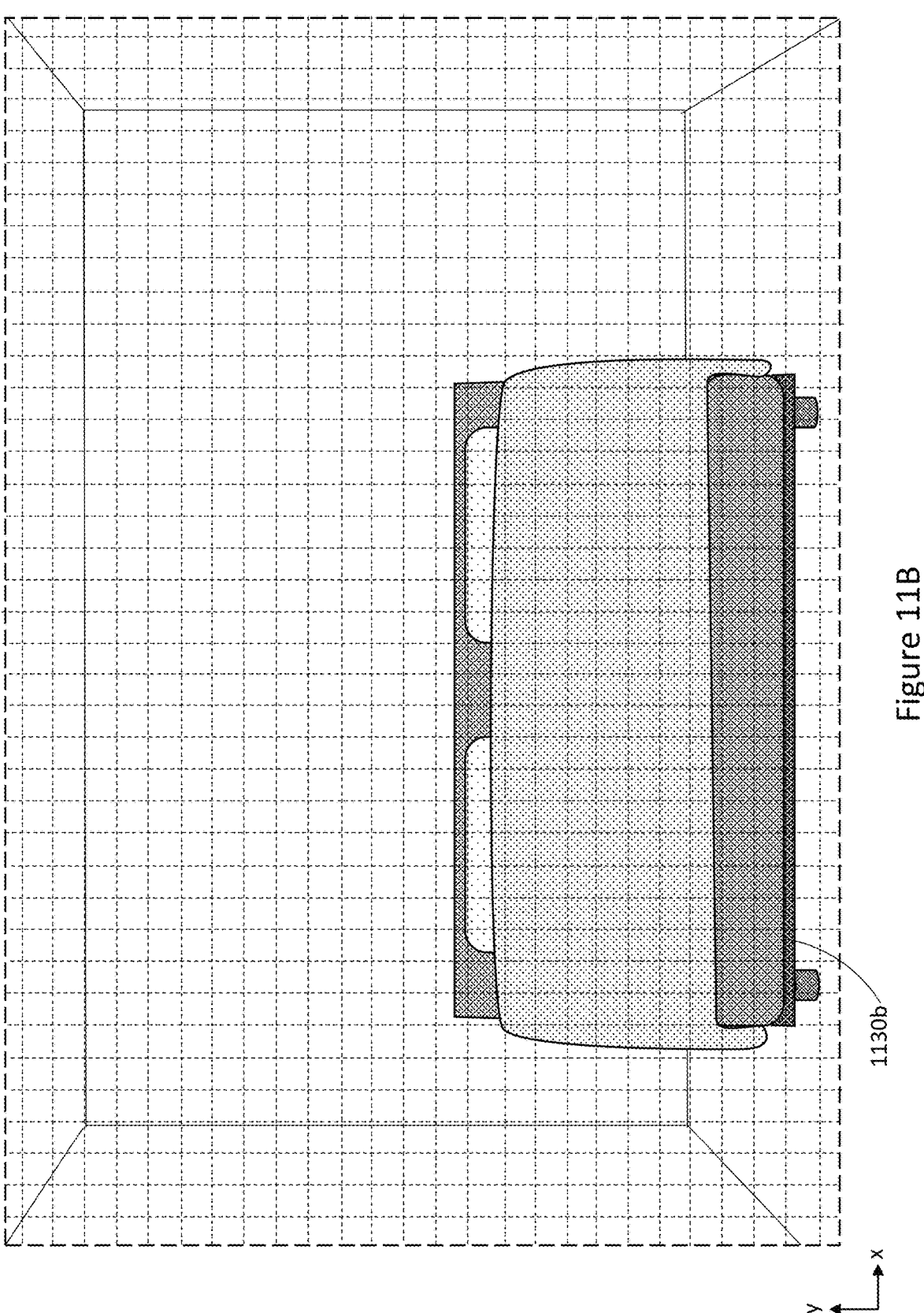
Figure 11C:
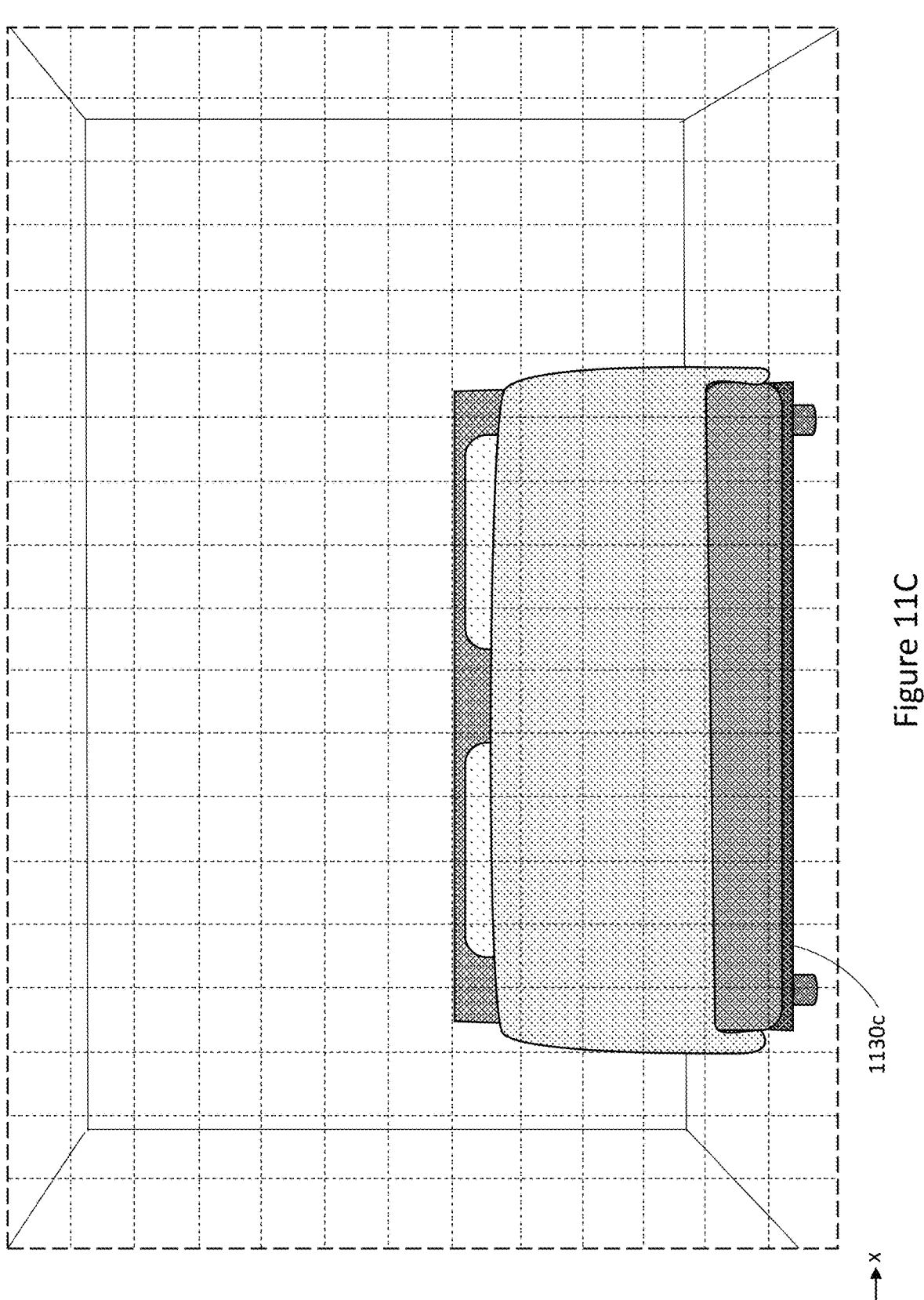

FIGS. 11A, 11B, and 110 discussed below illustrate examples where pixel matching is used to identify the location in act 614 of method 600.

FIG. 11A illustrates the first view of environment 500 from the first vantage point 590, similar to as discussed above with reference to FIGS. 5A and 5B. Several features and objects in environment 500 are not expressly labeled in FIG. 11A to avoid clutter, but the description of environment 500 with reference to FIGS. 5A and 5B is fully applicable to the example of FIG. 11A. FIG. 11A does include a label for bed 530, which is discussed later. In FIG. 11A, the first view comprises image data having a first resolution, as shown by a plurality of pixels (represented by a square grid in FIG. 11A). In particular, 39 columns of pixels span the 'x' dimension, and 27 rows of pixels span the 'y' dimension. As illustrated in FIG. 11A, the first view comprises first image data having a resolution of 39×27 pixels or 1053 total pixels. The resolution shown in FIG. 11A is merely illustrative, and in practice image data can have much higher resolution. Further, the features in the image data are shown with greater clarity than a resolution of 39×27 pixels, so that the features can be readily perceived and understood.

FIG. 11B illustrates the second view of environment 700 from the second vantage point 790, similar to as discussed above with reference to FIGS. 7A and 7B. Several features and object models in environment model 700 are not expressly labeled in FIG. 11B to avoid clutter, but the description of environment model 700 with reference to FIGS. 7A and 7B is fully applicable to the example of FIG. 11B. FIG. 11B does include a label for an instance 1130*b* of an object model for bed 530, which is discussed later. In FIG. 11B, the second view comprises image data having a second resolution, as shown by a plurality of pixels (represented by a square grid in FIG. 11B). In particular, 39 columns of pixels span the 'x' dimension, and 27 rows of pixels span the 'y' dimension. As illustrated in FIG. 11B, the second view comprises second image data having a resolution of 39×27 pixels or 1053 total pixels. That is, in the example of FIG. 11B, the second resolution is equal to the first resolution in FIG. 11A. Similar to as discussed above, the resolution shown in FIG. 11B is merely illustrative, and in practice image data can have much higher resolution. Further, the features in the image data in FIG. 11B are shown with greater clarity than a resolution of 39×27 pixels, so that the features can be readily perceived and understood.

In the implementations discussed with reference to FIGS. 11A, 11B, and 110, identifying the location in the environment model where at least one spatial dimension of the instance of the object model in the second view of the environment model from the second vantage point substantially matches a corresponding spatial dimension of the object in the first view of the environment from the first vantage point (as in act 614 of method 600) comprises: identifying the location in the environment model where a number of pixels occupied by the instance of the object model in the second image data corresponds to a number of pixels occupied by the object in the first image data.

In the example of FIG. 11B, the first resolution is equal to the second resolution. Consequently, identifying the location in the environment model where a number of pixels occupied by the instance of the object model in the second image data corresponds to a number of pixels occupied by the object in the first image data comprises: identifying the location in the environment model where a number of pixels occupied by the instance of the object model in the second image data substantially matches a number of pixels occupied by the object in the first image data. In particular, FIG. 11B shows an instance 1130*b* of bed 530 (positioned and oriented to align with a position and orientation of bed 530 in the first image data in FIG. 11A). In the first image data shown in FIG. 11A, bed 530 occupies 22 pixels horizontally (in the 'x' direction). Instance 1130*b* of bed 530 is scaled (by selecting a distance of instance 1130*b* from the second vantage point, i.e. by identifying a location of instance 1130*b* relative to the second vantage point 790) such that instance 1130*b* occupies 22 pixels horizontally in the second image data. A similar process could be performed for any appropriate dimension of an object and object model.

FIG. 110 illustrates an alternative implementation, including the second view of environment 700 from the second vantage point 790, similar to as discussed above with reference to FIGS. 7A and 7B. Several features and object models in environment model 700 are not expressly labeled in FIG. 110 to avoid clutter, but the description of environment model 700 with reference to FIGS. 7A and 7B is fully applicable to the example of FIG. 110. FIG. 110 does include a label for an instance 1130*c* of an object model for bed 530, which is discussed later. In FIG. 110, the second view comprises image data having a second resolution, as shown by a plurality of pixels (represented by a square grid in FIG. 11C). In particular, 19 columns of pixels span the 'x' dimension, and 13 rows of pixels span the 'y' dimension. As illustrated in FIG. 110, the second view comprises second image data having a resolution of 19×13 pixels or 247 total pixels. That is, in the example of FIG. 110, the second resolution is different from the first resolution in FIG. 11A. In particular, the second resolution is different from the first resolution by a fixed ratio. In the second image data, the horizontal number of pixels (horizontal resolution) is 19/39 of the horizontal aspect of the first resolution, and the vertical number of pixels (vertical resolution) is 13/27 of the vertical aspect of the first resolution. Similar to as discussed above, the resolution shown in FIG. 110 is merely illustrative, and in practice image data can have much higher resolution. Further, the features in the image data in FIG. 110 are shown with greater clarity than a resolution of 19×13 pixels, so that the features can be readily perceived and understood.

In the example of FIG. 110, the first resolution is different from the second resolution by a fixed ratio as discussed above. Consequently, identifying the location in the environment model where a number of pixels occupied by the instance of the object model in the second image data corresponds to a number of pixels occupied by the object in the first image data comprises: identifying the location in the environment model where a number of pixels occupied by the instance of the object model in the second image data substantially matches a number of pixels occupied by the object in the first image data multiplied by the fixed ratio. In particular, FIG. 110 shows an instance 1130*c* of bed 530 (positioned and oriented to align with a position and orientation of bed 530 in the first image data in FIG. 11A). In the first image data shown in FIG. 11A, bed 530 occupies 22 pixels horizontally (in the 'x' direction). Instance 1130*c* of bed 530 is scaled (by selecting a distance of instance 1130*c* from the second vantage point, i.e. by identifying a location of instance 1130*c* relative to the second vantage point 790) such that instance 1130*b* occupies 11 pixels (22 pixels multiplied by the horizontal fixed ratio of 13/27, rounded to the nearest whole pixel) horizontally in the second image data. A similar process could be performed for any appropriate dimension of an object and object model.

Similar to as discussed above with reference to FIGS. 9, 10A, and 10B, determining a location where a number of pixels occupied by the instance of the object model in the second image data "substantially" matches a corresponding number of pixels occupied by the object in the first view does not require that the numbers of pixels be determined as being equal. For example, the numbers of pixels may be determined as "substantially" matching if they are within a threshold of each other. For example, the numbers of pixels may be determined as substantially matching if the number of pixels occupied by the instance of the object model in the second image data is within a 1%, 10%, or 20% difference to the number of pixels occupied by the object in the first image data, as non-limiting examples.

Figure 12:
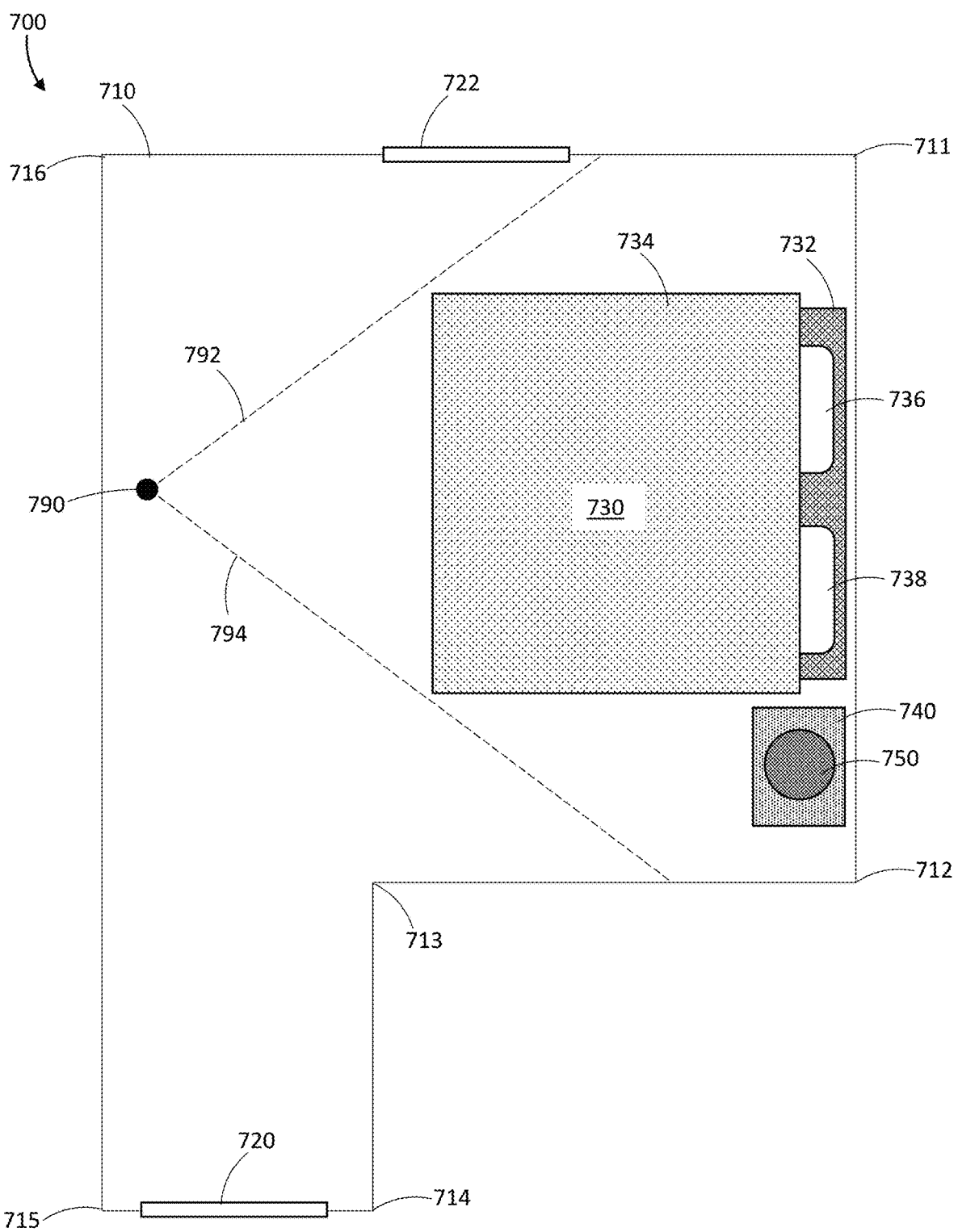
FIG. 12 is a top view of the environment model shown in FIGS. 7A and 7B, populated in accordance with at least one exemplary implementation.

Returning to method 600 in FIG. 6, the method may optionally further comprise determining a distance in the environment model between the second vantage point and the instance of the object model at the location. That is, the at least one processor can determine how far the object is from the second vantage point, based on where the object is determined to be in the environment model. This can be performed regardless of how the location of the instance of the object model is determined. In one exemplary implementation, the second vantage point may be positioned at first coordinates at the environment model, and the object may be positioned at second coordinates in the environment model. Distance between the second vantage point and the object can be determined by calculating distance between the first coordinates and the second coordinates. Further in method 600 in FIG. 6, at 616 the instance of the object model is positioned at the location identified in act 614. The is, the instance of the object is populated, inserted, or otherwise added to the environment model, at the identified location. In this way, subsequently rendered or generated views of the environment model will include the instance of the object model at the location. This is shown in FIG. 12, which is a top view of environment model 700, similar to as illustrated in FIG. 7A. Description of environment model 700 with reference to FIGS. 7A and 7B is fully applicable to environment model 700 in FIG. 12. One difference between FIG. 7A and FIG. 12 is that environment model 700 in FIG. 12 is populated with an instance 730 of an object model representing bed 530, and instance 740 of an object model representing nightstand 540, and an instance 750 of an object model representing vase 550. Instance 730 is also illustrated with instance 732 (representing mattress 532), instance 734 (representing blanket 534), instance 736 (representing pillow 536), and instance 738 (representing pillow 538). Further, instances 730, 740, and 750 are populated in environment model 700 at positions corresponding to bed 530, nightstand 540, and vase 550 in environment 500 as discussed with reference to FIGS. 5A and 5B. The respective location for each of instances 730, 740, and 750 can be determined as discussed above with reference to FIGS. 9, 10A, 10B, 11A, 11B, and 110. Further, the location for any particular instance can be determined using any appropriate technique. That is, FIG. 9 exemplifies determining the location for an instance of vase 550; FIGS. 10A and 10B exemplify determining the location for an instance of nightstand 540; and FIGS. 11A, 11B, and 110 exemplify determining the location for an instance of bed 530. However, any of the described techniques could be applied to any of the other objects. Further, each technique is not necessarily used in a given application. For example, a respective location for each of instance 730, 740, and 750 could be determined by one technique, as appropriate for a given application.

Matching a spatial dimension of the instance of the object model in the second view to a corresponding spatial dimension of the object in the first view, as in act 614 of method 600, is used to determine a location at which to position the instance of the object model in act 616 of method 600, as discussed above. However, in some implementations, matching a spatial dimension of the instance of the object model in the second view to a corresponding spatial dimension of the object in the first view as in act 614 of method 600 is limited to determining a "depth" of the object in the second view (i.e. how far away to position the instance of the object model in the environment model from the second vantage point). With reference to FIGS. 7B, 9, 10A, 10B, 11A, 11B, and 110, determining the location of the instance of the object from the second vantage point can refer to determining the location of the instance of the object model along the z-axis (distance of a plane into the page, or "depth" location). Alternatively, determining the location of the instance of the object from the second vantage point can refer to determining a radius from the vantage point (i.e. a distance from the second vantage point, represented as a sphere around the second vantage point).

In such implementations, a three-dimensional location of the instance of the object can be fully determined with the use of a combination of techniques. For example, with reference to FIGS. 10A and 10B, x and y coordinates for the instance of the object can be determined by aligning the instance of the object model in the second view with the object as seen in the first view. Determining the location along the z-axis (e.g., "depth" or "depth location") of the instance of the object model in the second view can be determined by matching a spatial dimension of the instance of the object model in the second view to a corresponding spatial dimension of the object in the first view as in act 614 of method 600, as discussed above.

In some implementations, method 600 in FIG. 6 further comprises generating the object model representing the object in the library of models. In some cases, this comprises an additional act, where the object model is generated prior to the object model being accessed in act 606. In other cases, accessing the object model in act 606 itself comprises generating the object model (for example if it is determined that no suitable object model exists in the library of object models). Further, generating the object model (whether as an independent act or in act 606) can comprise generating the object model representing the object, including the dimension data indicative of the spatial dimensions of the object.

FIGS. 13A, 13B, 13C, and 14 below discuss specific examples of how an object model can be generated. The illustrated scenarios are merely exemplary, and an object model can be generated in any appropriate manner, for any appropriate object, in the context of a particular application.

In one implementation, at least one image sensor captures image data representing the object from multiple viewpoints. In such an implementation, generating the object model representing the object in the library of object models comprises generating the object model based on the captured image data from multiple viewpoints. In an example of this implementation, FIGS. 13A, 13B, and 13C illustrate image data captured by at least one image sensor of a device which views a brush 1390 (an object for which an object model is being generated). In each of FIGS. 13A, 13B, and 13C, brush 1390 has a handle 1392, metal band 1394, and bristles 1396.

FIG. 13A shows image data 1310, in which brush 1390 is shown from a first viewpoint. FIG. 13B shows image data 1320, in which brush 1390 is shown from a second viewpoint, grasped by an end effector 1380 having thumb 1382 and forefinger 1384. FIG. 13C shows image data 1330, in which brush 1390 is shown from a third viewpoint, grasped by end effector 1380 between thumb 1382 and forefinger 1384. FIGS. 13A, 13B, and 13C show an example where a device (such as a robot body) uses an end effector to manipulate brush 1390, to position brush 1390 in different poses before at least one image sensor, to capture image data representing brush 1390 from different viewpoints. Dimensions, features, and aspects of the brush 1390 (the object) are generated (e.g. by at least one processor of the robot body or of a robot controller remote from the robot body) based on brush 1390 as represented in image data 1310, 1320, and 1330. In alternative scenarios or implementations, the at least one image sensor could be moved relative to the object to capture image data from different viewpoints (e.g. a robot carrying the at least one image sensor can move to view the object from different angles).

Figure 14:
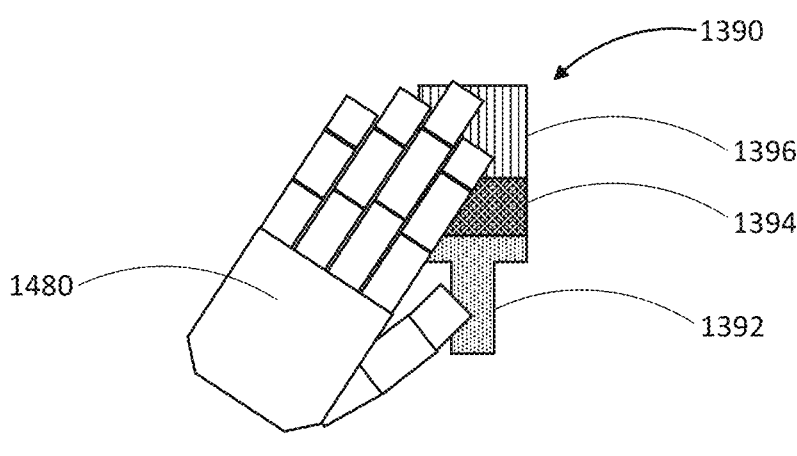
FIG. 14 is a scene view showing collection of haptic data, based on which an object model is generated in accordance with at least one exemplary implementation.

In another implementation, at least one haptic sensor positioned at an actuatable member which contacts the object captures haptic data representing the object. In such an implementation, generating the object model representing the object in the library of object models comprises generating the object model based on the captured haptic data. In an example of this implementation, FIG. 14 illustrates a scenario where haptic data representing a brush 1390 (an object for which an object model is being generated, similar to as discussed with reference to FIGS. 13A, 13B, and 13C). In particular, FIG. 14 shows a hand-shaped end effector 1480 (actuatable member) contacting brush 1390. While not visible in FIG. 14 due to being occluded by end effector 1480, at least one haptic sensor is positioned on end effector 1480 (such as shown regarding haptic sensors 124 or 125 in FIG. 1, haptic sensors 221 in FIG. 2, or haptic sensors 314 in FIG. 3), such that said at least one haptic sensor contacts brush 1390. Dimensions, features, and aspects of the brush 1390 (the object) are generated (e.g. by at least one processor of the robot body or of a robot controller remote from the robot body) based on brush 1390 as represented in the collected haptic data.

Generation of an object model is not necessarily limited to data collected by one type of sensor. Rather, data collected by a plurality of different sensor types can be used to generate an object model. For example, image data can be collected as discussed with reference to FIGS. 13A, 13B, and 13C, and haptic data can be collected as discussed with reference to FIG. 14. An object model can be generated based on both the image data and the haptic data. Other types of collected data could also be used, such as the types of data discussed earlier with reference to FIG. 1.

As mentioned earlier, acts of method 600 can be performed by components of a robotic system which are included at a robot body of the system, or by components of the robotic system which are remote from the robot body of the system (e.g. included on a remote device such as a robot controller of the system). For example, acts performed by at least one processor of the system can be performed by a processor at the robot body or a processor at the remote device. Likewise, data (such as the environment model, the library of object models, or processor-executable instructions which when executed cause acts to be performed) can be stored at a non-transitory processor-readable storage medium at the robot body, or a non-transitory processor-readable storage medium at the remote device. Further, the acts of method 600 do not have to performed exclusively by components at the robot body or components at the remote device. Rather, some acts can be performed by components at the robot body, and some acts can be performed by components at the remote device, within a given implementation.

In one non-limiting exemplary implementation, all of acts 602, 604, 606, 610, 612, 614, and 616 are performed by respective components at the robot body. In particular, the at least one processor is carried by the robot body positioned at the environment, and performs acts 602, 604, 606, 610, 612, 614, and 616. Further, at least one non-transitory processor-readable storage medium is carried by the robot body, and stores the library of object models and the environment model. The at least one non-transitory processor-readable storage medium may further store data and/or processor-executable instructions which, when executed by the at least one processor, cause the robot body (or components thereof) to perform method 600. Method 600 can further comprise an act of storing the environment model at the at least one non-transitory processor-readable storage medium, for example where the environment model is generated in the course of method 600, or to store an updated environment model after population thereof.

In another non-limiting exemplary implementation, all of acts 602, 604, 606, 610, 612, 614, and 616 are performed by respective components at the robot controller. In particular, the at least one processor is carried by the robot controller positioned remote from the environment, and performs acts 602, 604, 606, 610, 612, 614, and 616. Further, at least one non-transitory processor-readable storage medium is carried by the robot controller, and stores the library of object models and the environment model. The at least one non-transitory processor-readable storage medium may further store data and/or processor-executable instructions which, when executed by the at least one processor, cause the robot controller (or components thereof) to perform method 600. Method 600 can further comprise an act of storing the environment model at the at least one non-transitory processor-readable storage medium, for example where the environment model is generated in the course of method 600, or to store an updated environment model after population thereof.

In yet other non-limiting exemplary implementations, acts 602, 604, 606, 610, 612, 614, and 616 are performed by respective components at the robot body and the robot controller in combination. In a particular example, the at least one processor is carried by the robot body positioned at the environment, and performs acts 602, 604, 606, 610, 612, 614, and 616. Further, a first at least one non-transitory processor-readable storage medium is carried by the robot body and stores the environment model. Further still a second at least one non-transitory processor-readable storage medium is carried by the robot controller and stores the library of object models. The robot body includes a communication interface communicatively couplable to the robot controller. Accessing the environment model representation of the environment as in act 602 comprises accessing, by the at least one processor, the environment model stored at the first at least one non-transitory processor-readable storage medium. Accessing the first view of the environment as in act 604 comprises accessing, by the at least one processor, the first view of the environment stored at the first at least one non-transitory processor-readable storage medium. Accessing the object model in the library of object models, as in act 606, comprises accessing the object model in the library of object models stored at the second at least one non-transitory processor-readable storage medium, via the communication interface. Generating a second view of the environment model from the second vantage point as in act 612, comprises generating, by the at least one processor, the second view of the environment model. Identifying the location in the environment model, as in act 614, comprises identifying, by the at least one processor, the location in the environment model. Positioning the instance of the object model at the location, as in act 616, comprises updating, by the at least one processor, the environment model stored at the first at least one non-transitory processor-readable storage medium to include the instance of the object model at the location.

In yet other implementations, a robot body can carry a first at least one processor, and a robot controller can carry a second at least one processor. With either of the first or second processor performing acts 602, 604, 606, 610, 612, 614, and 616 of method 600, as appropriate for a given application.

The above discussion provides examples for what hardware can perform which acts of method 600. These examples are merely exemplary, and any appropriate hardware can perform acts of method 600 as is suitable for a given application. Further, any appropriate data can be transmitted between the robot body and the remote device, by at least one communication interface as described with reference to FIG. 3, to enable the robot body and the remote device (robot controller) to perform desired acts in accordance with the above-discussed implementations, or in accordance with any other implementation.

The robots described herein may, in some implementations, employ any of the teachings of U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), U.S. Provisional Patent Application Ser. No. 63/001,755 (Publication No. US 2021-0307170 A1), and/or U.S. Provisional Patent Application Ser. No. 63/057,461, as well as U.S. Provisional Patent Application Ser. No. 63/151,044, U.S. Provisional Patent Application Ser. No. 63/173,670, U.S. Provisional Patent Application Ser. No. 63/184,268, U.S. Provisional Patent Application Ser. No. 63/213,385, U.S. Provisional Patent Application Ser. No. 63/232,694, U.S. Provisional Patent Application Ser. No. 63/253,591, U.S. Provisional Patent Application Ser. No. 63/293,968, U.S. Provisional Patent Application Ser. No. 63/293,973, U.S. Provisional Patent Application Ser. No. 63/278,817, and/or U.S. patent application Ser. No. 17/566,589, each of which is incorporated herein by reference in its entirety.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present robots, robot systems and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:
1. A method comprising:
accessing, by at least one processor, an environment model representation of an environment;
accessing, by the at least one processor, a first view of the environment from a first vantage point, the first vantage point having a position and a perspective in relation to the environment, wherein the first view comprises first image data having a first resolution and the first view includes an object in the environment;
accessing, in a library of object models, an object model representation of the object, the object model including dimension data indicative of spatial dimensions of the object; and
populating the environment model with an instance of the object model at a location in the environment model, wherein populating the environment model with the instance of the object model at the location includes:
generating a second view of the environment model from a second vantage point, wherein the second view comprises second image data having a second resolution and a position and a perspective of the second vantage point in relation to the environment model substantially match the position and the perspective of the first vantage point in relation to the environment;
identifying the location in the environment model where a number of pixels occupied by the instance of the object model in the second image data corresponds to a number of pixels occupied by the object in the first image data; and
positioning the instance of the object model at the location.
2. The method of claim 1, wherein:
the first resolution is equal to the second resolution; and
identifying the location in the environment model where a number of pixels occupied by the instance of the object model in the second image data corresponds to a number of pixels occupied by the object in the first image data comprises: identifying the location in the environment model where a number of pixels occupied by the instance of the object model in the second image data is equal to a number of pixels occupied by the object in the first image data.
3. The method of claim 1, wherein:
the first resolution is different from the second resolution by a fixed ratio;
identifying the location in the environment model where a number of pixels occupied by the instance of the object model in the second image data corresponds to a number of pixels occupied by the object in the first image data comprises: identifying the location in the environment model where a number of pixels occupied by the instance of the object model in the second image data is equal to a number of pixels occupied by the object in the first image data multiplied by the fixed ratio.

4. The method of claim 1, further comprising generating the object model representing the object in the library of object models.

5. The method of claim 4, wherein generating the object model representing the object comprises generating the object model representing the object, including the dimension data indicative of the spatial dimensions of the object.

6. The method of claim 4, further comprising capturing, by at least one image sensor, image data representing the object from multiple viewpoints, wherein generating the object model representing the object in the library of object models comprises generating the object model based on the captured image data from multiple viewpoints.

7. The method of claim 4, further comprising capturing, by at least one haptic sensor positioned at an actuatable member which contacts the object, haptic data representing the object, wherein generating the object model representing the object in the library of object models comprises generating the object model based on the captured haptic data.

8. The method of claim 1, wherein:

the environment is a three-dimensional environment;

the environment model is a three-dimensional environment model;

the first view comprises first two-dimensional image data representing the environment from the first vantage point;

the second view comprises second two-dimensional image data representing the environment model from the second vantage point; and populating the environment model with the instance of the object model at the location further comprises, prior to identifying the location, positioning the instance of the object model in the second image data to correspond to a position of the object in the first image data.

9. The method of claim 8, wherein populating the environment model with the instance of the object model at the location further comprises, prior to identifying the location, orienting the instance of the object model in the second image data to correspond to an orientation of the object in the first image data.

10. The method of claim 8, further comprising determining a distance in the environment model between the second vantage point and the instance of the object model at the location.

11. The method of claim 1, wherein the environment is a physical environment, and the environment model is a representation of the physical environment.

12. The method of claim 1, wherein the environment is a virtual environment, and the environment model is a representation of the virtual environment.

13. The method of claim 1, wherein:

the at least one processor is carried by a robot body positioned at the environment; and the robot body carries at least one non-transitory processor-readable storage medium which stores the library of object models and the environment model.

14. The method of claim 1, wherein:

the at least one processor is positioned at a robot controller remote from the environment; and the robot controller includes at least one non-transitory processor-readable storage medium which stores the library of object models and the environment model.

15. The method of claim 1, wherein:

the at least one processor is carried by a robot body positioned at the environment;

the robot body carries a first at least one non-transitory processor-readable storage medium which stores the environment model;

a robot controller remote from the robot body and operable to provide control data to the robot body, includes a second at least one non-transitory processor-readable storage medium which stores the library of object models;

the robot body includes a communication interface communicatively couplable to the robot controller;

accessing the environment model representation of the environment comprises accessing, by the at least one processor, the environment model stored at the first at least one non-transitory processor-readable storage medium;

accessing the first view of the environment comprises accessing, by the at least one processor, the first view of the environment stored at the first at least one non-transitory processor-readable storage medium;

accessing, in the library of object models, the object model comprises accessing the object model in the library of models stored at the second at least one non-transitory processor-readable storage medium, via the communication interface;

generating a second view of the environment model from the second vantage point comprises generating, by the at least one processor, the second view of the environment model;

identifying the location in the environment model comprises identifying, by the at least one processor, the location in the environment model; and positioning the instance of the object model at the location comprises updating, by the at least one processor, the environment model stored at the first at least one non-transitory processor-readable storage medium to include the instance of the object model at the location.

16. The method of claim 1, further comprising capturing, by at least one image sensor, image data representing the first view of the environment from the first vantage point.

17. A method comprising:

accessing, by at least one processor, an environment model representation of an environment;

accessing, by the at least one processor, a first view of the environment from a first vantage point, the first vantage point having a position and a perspective in relation to the environment, wherein the first view includes an object in the environment;

capturing, by at least one haptic sensor positioned at an actuatable member which contacts the object, haptic data representing the object;

generating, based on the captured haptic data, an object model representing the object;

accessing, in a library of object models, the object model representation of the object, the object model including dimension data indicative of spatial dimensions of the object; and populating the environment model with an instance of the object model at a location in the environment model, wherein populating the environment model with the instance of the object model at the location includes:

generating a second view of the environment model from a second vantage point, wherein a position and a perspective of the second vantage point in relation to the environment model substantially match the position and the perspective of the first vantage point in relation to the environment;

identifying the location in the environment model where at least one spatial dimension of the instance of the object model in the second view of the environment model from the second vantage point substantially matches a corresponding spatial dimension of the object in the first view of the environment from the first vantage point; and positioning the instance of the object model at the location.

* * * * *